(12) United States Patent
Kruger et al.

(10) Patent No.: US 7,062,417 B2
(45) Date of Patent: Jun. 13, 2006

(54) MULTIVARIATE STATISTICAL PROCESS MONITORS

(75) Inventors: Uwe Kruger, Belfast (GB); Qian Chen, Nanjing (CN); David J. Sandoz, Gwynedd (GB)

(73) Assignee: Perceptive Engineering Limited, Lymm (GB)

( * ) Notice: Subject to any disclaimer, the term of this patent is extended or adjusted under 35 U.S.C. 154(b) by 704 days.

(21) Appl. No.: 09/815,274

(22) Filed: Mar. 23, 2001

(65) Prior Publication Data

US 2002/0072882 A1    Jun. 13, 2002

(30) Foreign Application Priority Data

Mar. 23, 2000  (GB) ................................. 0007063

(51) Int. Cl.
*G06F 17/10* (2006.01)
*G06F 7/60* (2006.01)
*G05B 13/02* (2006.01)
*H03F 1/26* (2006.01)

(52) U.S. Cl. .................... 703/2; 702/179; 702/181; 702/196; 702/198; 700/30; 700/49

(58) Field of Classification Search ................ 703/2; 702/179, 181, 196, 198; 700/30, 49
See application file for complete search history.

(56) References Cited

U.S. PATENT DOCUMENTS

| | | |
|---|---|---|
| 5,602,755 A | 2/1997 | Ashe et al. |
| 5,699,269 A | 12/1997 | Ashe et al. |
| 5,699,270 A | 12/1997 | Ashe et al. |
| 5,949,678 A | 9/1999 | Wold et al. |
| 5,976,466 A * | 11/1999 | Ratner et al. ............ 422/82.11 |

OTHER PUBLICATIONS

Antti, H. "Multivariate Characterization of Wood Related Materials" Nov. 26, 1999, pp. 1-42 out of 79. http://www.chem.umu.se/dep/ok/thesis/henrikantti/henrikantti.pdf.*

(Continued)

*Primary Examiner*—W. Thomson
*Assistant Examiner*—Ayal Sharon
(74) *Attorney, Agent, or Firm*—Fish & Richardson P.C.

(57) ABSTRACT

An extended partial least squares (EPLS) approach for the condition monitoring of industrial processes is described. This EPLS approach provides two statistical monitoring charts to detect abnormal process behaviour as well as contribution charts to diagnose this behaviour. A theoretical analysis of the EPLS monitoring charts is provided, together with two application studies to show that the EPLS approach is either more sensitive or provides easier interpretation than conventional PLS.

Figure 1:
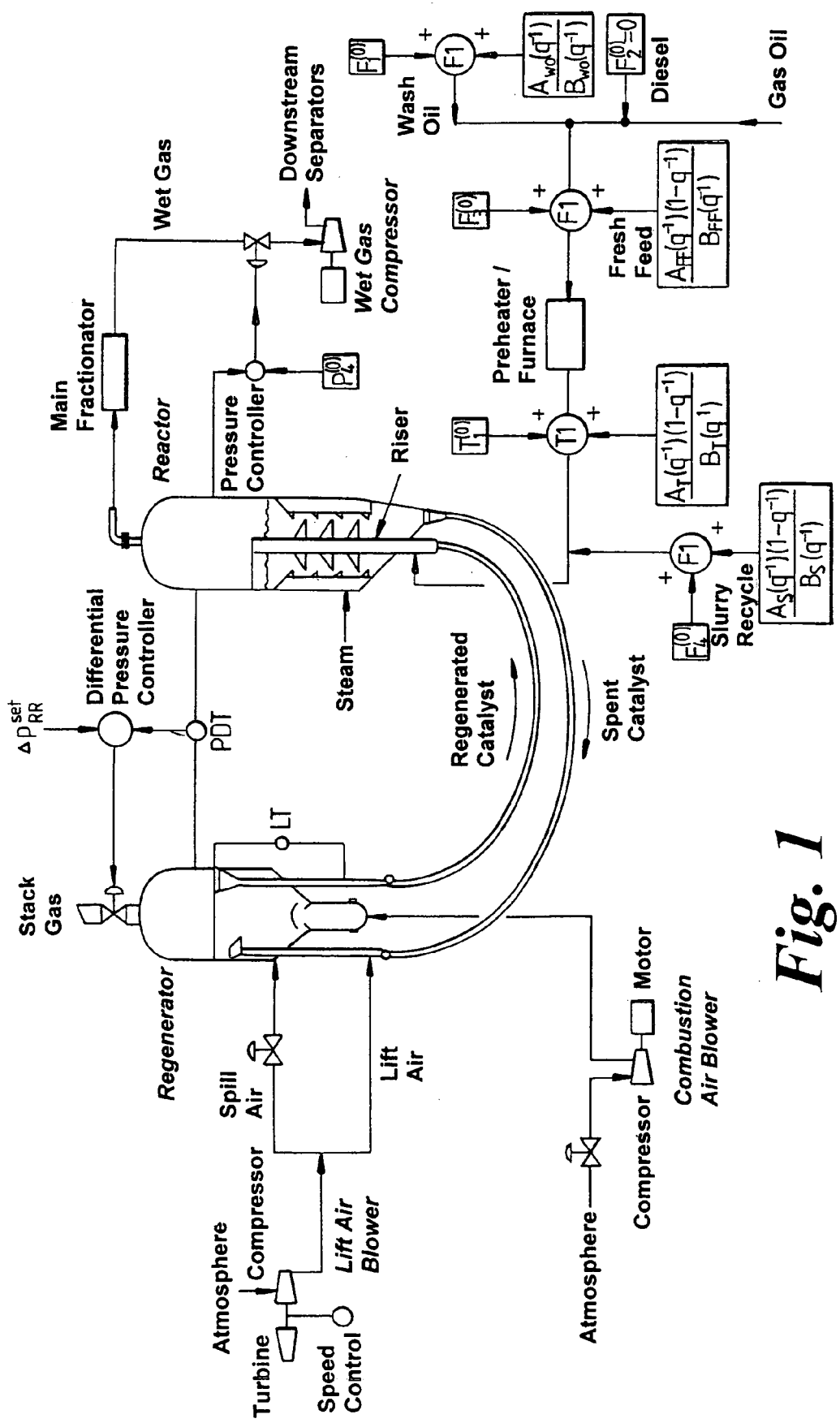

Generalised scores are calculated by constructing an augmented matrix, of the form $$Z = [Y \vdots X],$$

where X is the predictor matrix and Y is the response matrix, and constructing a score matrix $T_n = T^*_n - E^*_n$ in which $T^*_n$ and $E^*_n$ are generally of the form:

$$T^*_n = [Y \vdots X][B^{(n)}_{PLS} : \Im]^{1} R_n$$

$$E^*_n = [E_n \vdots F_n][B^{(n)}_{PLS} : \Im]^{1} R_n$$

the columns of the matrix $T^*_n$ providing the generalised t-scores and the columns of the matrix $E^*_n$ the generalised residual scores, where $\Im$ denotes an M×M identity matrix, $B_{PLS}^{(n)}$ is the PLS regression matrix.

13 Claims, 13 Drawing Sheets

OTHER PUBLICATIONS

E.C. Malthouse et al.; "Nonlinear Partial Least Squares"; *Computers Chemistry Engineering*, vol. 21, No. 8, pp. 875-890; 1997.

J.F. MacGregor et al.; "Statistical Process Control of Multivariate Processes"; *Control Engineering Practice*, vol. 3, No. 3; pp. 403-414; 1995.

E.B. Martin et al.; "Multivariate Statistical Process Control and Process Performance Monitoring"; *Proceedings of the 1998 IFAC Symposium on Dynamics and Control of Process Systems*, vol. 1; pp. 347-356; 1998.

Q. Chen et al., "The Application of Principal Component Analysis and Kernal Density Estimation to Enhance Process Monitoring", *Journal Control Engineering Practice*, No. 8, pp. 531-543, (2000).

R. Dunia et al., "Identification of Faulty Sensors Using Principal Component Analysis", *AIChE Journal*, vol. 42, No. 10, pp. 2797-2812, (1996).

R.C. McFarlane et al., "Dynamic Simulator For a Model IV Fluid Catalytic Cracking Unit", *Computers in Chemical Engineering*; vol. 17, No. 3, pp. 275-300 (1993).

P. Geladi et al., "Partial Least-Squares Regression: A Tutorial", *Analytica Chimica Acta*, vol. 185, pp. 1-17, (1986).

P. Geladi, "Notes on the History and Nature of Partial Least Squares (PLS) Modelling", *Journal of Chemometrics*, vol. 2, pp. 231-246 (1988).

A. Hoskuldsson, "PLS Regression Methods", *Journal of Chemometrics*, vol. 2, pp. 211-228, (1988).

S. de Jong, "SIMPLS: An Alternative Approach to Partial Least Squares Regression", *Chemometrics and Intelligent Laboratory Systems*, vol. 18, pp. 251-263, (1993).

K. A. Kosanovich et al., "Process Data Analysis Using Multivariate Statistical Methods", American Control Conference, Boston, Masschusetts.

T. Kourti et al., "Process Analysis, Monitoring and Diagnosis, Using Multivariate Projection" Methods, *Chemometrics and Intelligent Laboratory Systems*, vol. 28, pp. 3-21, (1995).

J. V. Kresta et al., "Multivariate Statistical Monitoring of Process Operating Performance", *The Canadian Journal of Chemical Engineering*, vol. 69, pp. 35-47, (1991).

F. Lindgren et al., "The Kernel Algorithm for PLS", *Journal of Chemometrics*, vol. 7, pp. 45-59 (1993).

J.F. MacGregor et al., "Multivariate Statistical Methods in Process Analysis and Control", AIChE Symposium Proceedings of the Fourth International Conference on Chemical Process Control, AIChE Publ. No. P-67, New York, pp. 79-99, (1991).

T.E. Morud, "Multivariate Statistical Process Control; Example From the Chemical Process Industry", *Journal of Chemometrics*, vol. 10, pp. 669-675 (1996).

I. Nimmo, "Adequately Address Abnormal Operations", *Chemical Engineering Progress*, vol. 91, No. 1, pp. 36-45 (1995).

P. Nomikos et al., "Multi-way Partial Least Squares in Monitoring Batch Processes", *Chemometrics and Intelligent Laboratory Systems*, vol. 30, pp. 97-108, (1995).

P. Nomikos, "Multivariate SPC Charts for Monitoring Batch Processes", *Technometrics*, vol. 37, No. 1, pp. 41-59, (1995).

R. Manne, "Analysis of Two Partial-Least-Squares Algorithms for Multivariate Calibration,", *Chemometrics and Intelligent Laboratory Systems*, vol. 2, pp. 187-197 (1987).

M. J. Piovoso et al., "Process Data Chemometrics", *IEEE Transactions on Instrumentation and Measurement*, vol. 41, No. 2, pp. 262-268 (1992).

B. M. Wise, "The Process Chemometrics Approach to Process Monitoring and Fault Detection", *Journal of Process Control*, vol. 6, No. 6, pp. 329-348 (1996).

H. Wold, "Estimation of Principal Components and Related Models by Interative Least Squares", University Institute of Statistics, Sweden, pp. 391.

S. Wold, "Cross-Validatory Estimation of the Number of Components in Factor and Principal Components Models", *Technometrics*, vol. 20, No. 4, pp. 397-405, (1978).

U. Krger et al., "On the Applicaiton of Non-Linear Partial Least Squares to Industrial Process Control", DYMAC Conference, (1999).

* cited by examiner

MULTIVARIATE STATISTICAL PROCESS MONITORS

This invention relates to multivariate statistical process monitors. The term 'process' is used in a broad control theory context to include controlled devices, plant and controlled systems generally.

INTRODUCTION

1.1 Background of the Invention

The detection and diagnosis of abnormal situations in the operation of industrial processes is a problem of considerable challenge that is attracting wide attention in both academe and industry. [Nimmo, 1995] outlined that, on its own, the US based petrochemical industry could save up to $10b per year if abnormal situations could be detected, diagnosed and appropriately dealt with. The consequences of not being able to detect such issues can range from increased operational costs in the running of a process to loss of production because of disastrous failure of the entire plant.

The task of detecting and diagnosing industrial processes, whether continuous or batch, is difficult. This is because industrial processes often present a large number of process variables, such as temperatures, pressures, flow rates, compositions, etc. which are regularly recorded up to several thousand times a day [Piovoso, 1991], [Kosanovich, 1992]. This very large amount of data is difficult to analyse and interpret simply by observation. Furthermore, it is also often the case that the process variables are highly correlated [MacGregor, 1991] and hence the number of degrees of freedom within the process is considerably smaller than the number of observed process variables. This makes it difficult for even an experienced operator to interpret cause and effect interaction by eye. However, the recorded data has embedded within it the substance for revealing the current state of process operation. The difficult issue is to extract this substance from the data.

To address this issue of detection and diagnosis, Multivariate Statistical Process Control (MSPC) approaches have been successfully employed [Kresta, 1991], [MacGregor, 1995], [Kourti, 1995]. The MSPC techniques aim to successively reduce the number of variables which are required to describe significant variation of the process. The recorded data are thereby compressed into a set of fewer variables which are accordingly more manageable and interpretable.

One such MSPC approach is Partial Least Squares (PLS) which was pioneered by H. Wold in the mid 1960s [Geladi, 1988]. The first publications on PLS were presented in 1966 [Wold, 1966a; 1966b]. The PLS method identifies a parametric regression matrix based upon predictor and response matrices that are constructed from reference data of the process. The predictor matrix is comprised of the signals of the manipulated and measured disturbance or cause variables of the process (predictor variables), whilst the response matrix is comprised of the controlled or effect variables of the process (response variables). The PLS algorithm decomposes the predictor and response matrices into rank one component matrices. Each component matrix is composed of a vector product in which one vector describes the variation (score vector) and the other the contribution (loading vector) of the score vector to either the predictor or response matrix. The decomposition is an iterative approach for which a pair of component matrices (one for the predictor and one for the response) is calculated at each iteration step. The regression matrix is updated at each iteration step as a result of this decomposition. The data reduction is achieved by compressing the variation of the predictor and response variables down to the smallest number of score vectors that are able to effectively describe process behaviour. The selection of the number of component matrices that need to be retained is a trade off between maximising the variation explained in the predictor and response matrices and minimising the number of component matrices. Cross Validation [Wold, 1978] is most commonly used to define the number of component matrices to be retained, e.g. [MacGregor, 1991, 1995], [Morud, 1996].

[MacGregor, 1995] and [Wise, 1996] established that the PLS decomposition of the predictor matrix can be employed for the condition monitoring of continuous industrial processes. They also highlight that this decomposition is similar to a Principal Component Analysis (PCA) of the predictor matrix. PLS decomposition of the predictor matrix allows the calculation of two statistics. The first statistic (the T squared statistic) describes variation of the predictor matrix that is significant for predicting the response variables. In contrast, the second statistic (the Q statistic) corresponds to variation in the predictor matrix, which is insignificant for predicting the response variables. Both statistics may be plotted in statistical monitoring-charts with a time base. This approach is hereinafter referred to as 'approach I'.

Another approach for exploiting PLS as a condition monitoring tool is discussed for instance in [MacGregor, 1991] and [Kresta, 1991]. In this approach, several statistical plots are used to detect and diagnose abnormal process behaviour. The plots are:

x-y plots of the squared prediction error of the response variables versus the score values of each score vector representing the predictor variables (monitoring charts), plots of each combination of two score vectors representing the predictor variables (scatter plots) and plots of the squared prediction error of either the predictor or response variables versus time (SPE charts).

This approach is hereinafter referred to in this description as 'approach II'.

1.2 Summaries of the Invention

In the following description, an extension to the standard PLS algorithm, hereinafter referred to as the 'extended PLS' or 'EPLS', is set forth for continuous processes. This extension results in the determination of two new PLS scores based on the score vectors of the predictor matrix. The new PLS score vectors are denoted as generalised score vectors. The first generalised score vector describes significant variation of the process including the predictor and response variables. The second generalised score vector represents the prediction error of the PLS model and residuals of the predictor matrix. The EPLS approach gives rise to monitoring charts for T squared and Q which are similar to those obtained from PCA when both predictor and response variables are analysed by PCA. This is distinct from the standard PLS approach which only analyses the predictor variables and therefore gives no insight into the behaviour of the response variables unless there is feedback in the process.

The advantage of the EPLS monitoring charts is therefore that they represent variation of the predictor and response variables together with their residuals. This improves the monitoring charts of approach I which only describe variation and residuals of the predictor variables. In contrast to approach II, EPLS provides the capability to monitor the process on just two charts, rather than the number of charts being dependent upon the number of component matrices.

According to one aspect of the present invention a method of designing/configuring a multivariate statistical process monitor by a partial least squares approach comprises constructing from reference data of the process predictor and response matrices, the predictor matrix being comprised of signals of the manipulated and measured disturbance or cause variables of the process (predictor variables), and the response matrix being comprised of the controlled or effect variables of the process (response variables), decomposing the predictor and response matrices into rank one component matrices, each of said component matrices being comprised of a vector product in which one vector (the score vector) describes the variation and the other (the loading vector) the contribution of the score vector to the predictor or response matrix, decomposition being performed by the creation of a parametric regression matrix based upon iterations of the decomposition of the predictor and response matrices, characterised by the creation of a first generalised score vector which describes any significant variation of the process including variations of the predictor and response variables, and a second generalised score vector which represents the prediction error of the partial least squares model and residuals of the predictor matrix.

Preferably the generalised scores are calculated by constructing an augmented matrix, denoted here by Z and of the form $$Z = [Y \vdots X],$$

where X is the predictor matrix and Y is the response matrix, and constructing a score matrix $T_n = T^*_n - E^*_n$ in which $T^*_n$ and $E^*_n$ are generally of the form:

$$T_n^* = [Y \vdots X][B_{PLS}^{(n)} \vdots \Im]^+ R_n$$

$$E_n^* = [E_n \vdots F_n][B_{PLS}^{(n)} \vdots \Im]^+ R_n$$

the columns of the matrix $T^*_n$ providing the generalised t-scores and the columns of the matrix $E^*_n$ the generalised residual scores, where $\Im$ denotes an M×M identity matrix, $B_{PLS}^{(n)}$ is the PLS regression matrix.

According to a second aspect of the invention we provide a multivariate statistical process monitor which has been designed/configured in accordance with the first aspect of the invention and which is so arranged as to identify abnormal process behaviour by analysing the residuals of the response variables.

According to a third aspect of the invention we provide a method of monitoring a process which comprises configuring a multivariate statistical process monitor by the method of the first aspect of the invention, and identifying abnormal process behaviour, at least in part, by analysing the residuals of the response variables.

Figure 2:
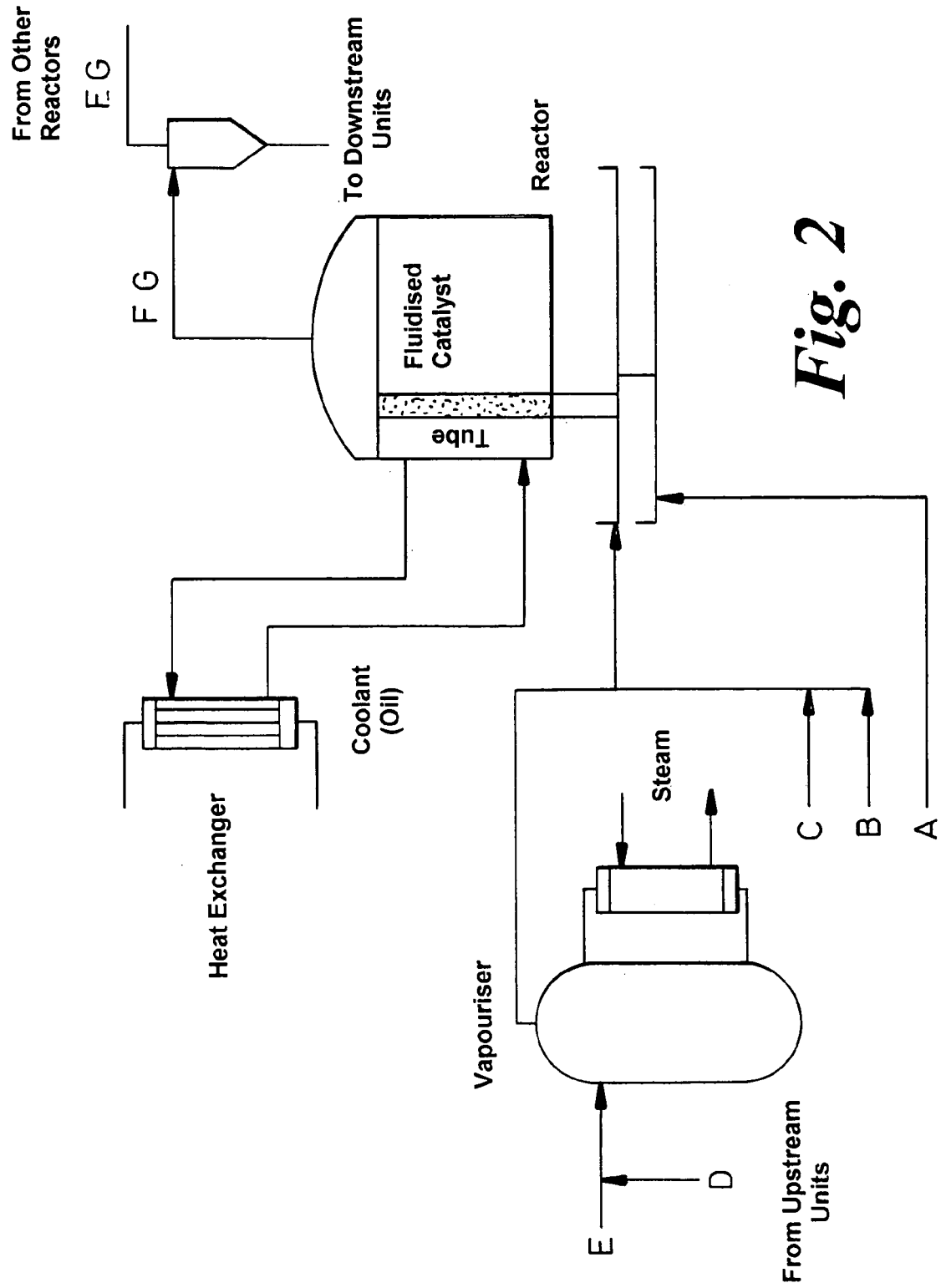

The invention will now be further described, by way of example only, with reference to the accompanying Figures which show:

FIG. 1—Schematic Diagram Of The Fluid Catalytic Cracking Unit,

FIG. 2—Schematic Diagram of one Fluidised Bed Reactor and its adjacent Units

Figure 3:
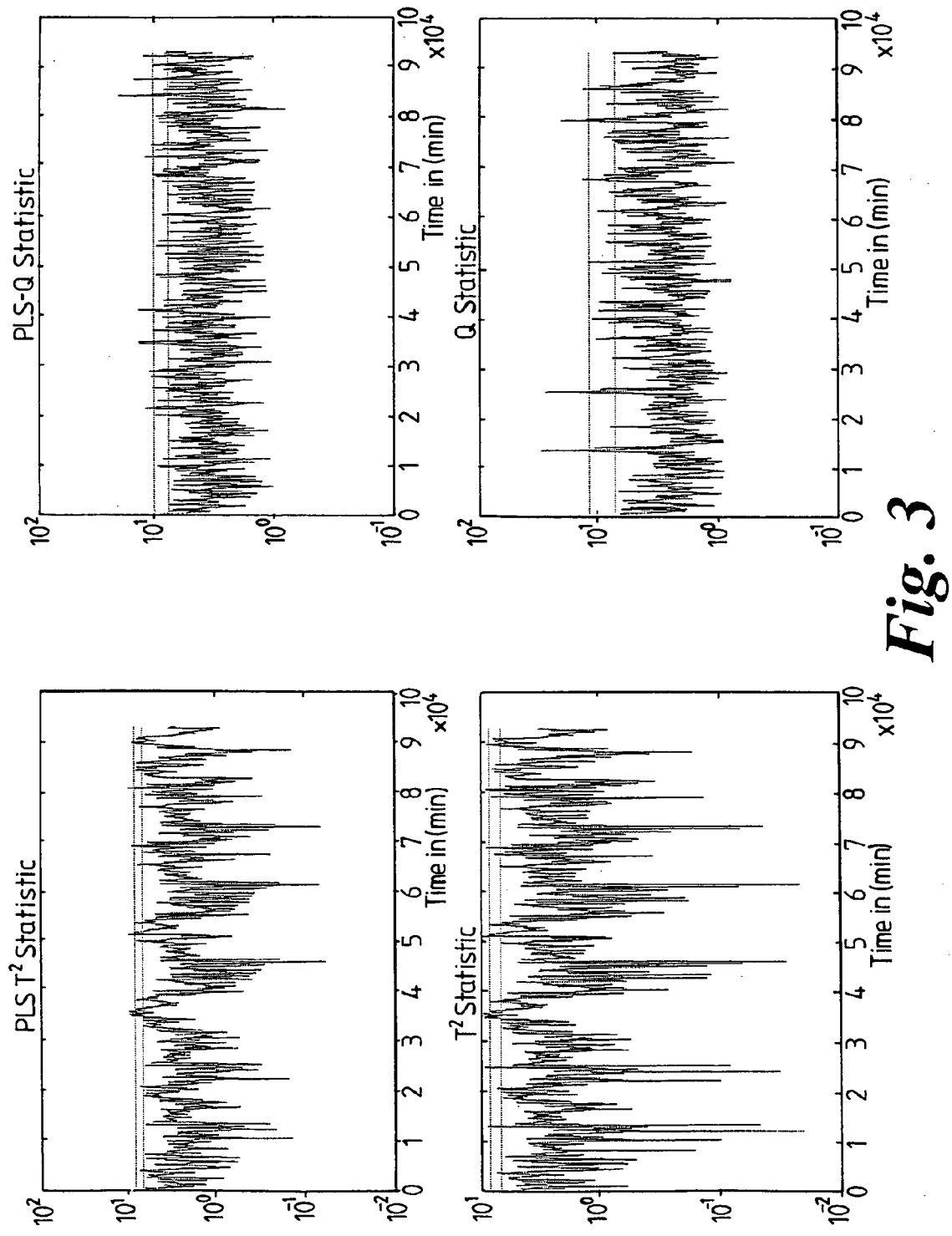
Figure 4:
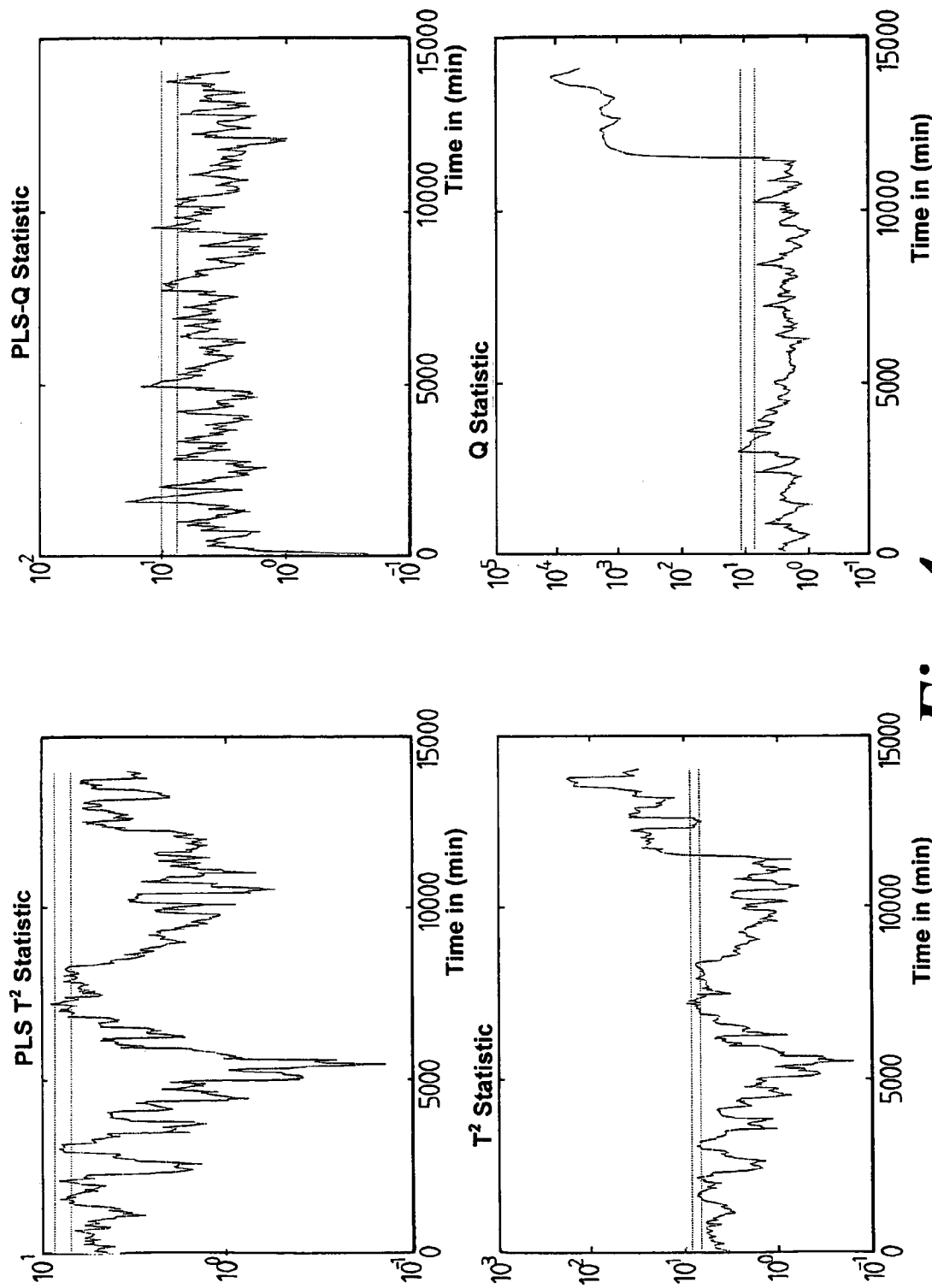

Figures for Fluid Catalytic Cracking Unit without Controller Feedback in Predictor Matrix:

FIG. 3—Statistics Monitoring Charts for Normal Operating Data (Upper Charts represent the PLS Monitoring Charts -PLS-$T^2$ and -Q statistic- and Lower Charts show the EPLS Monitoring Charts -EPLS-$T^2$ and -Q statistics-), FIG. 4—Statistical Monitoring Charts for the Unmeasured Disturbance (Upper Charts represent the PLS Monitoring Charts -PLS-$T^2$ and -Q statistic- and Lower Charts show the EPLS Monitoring Charts -EPLS-$T^2$ and -Q statistic)

Figure 5:
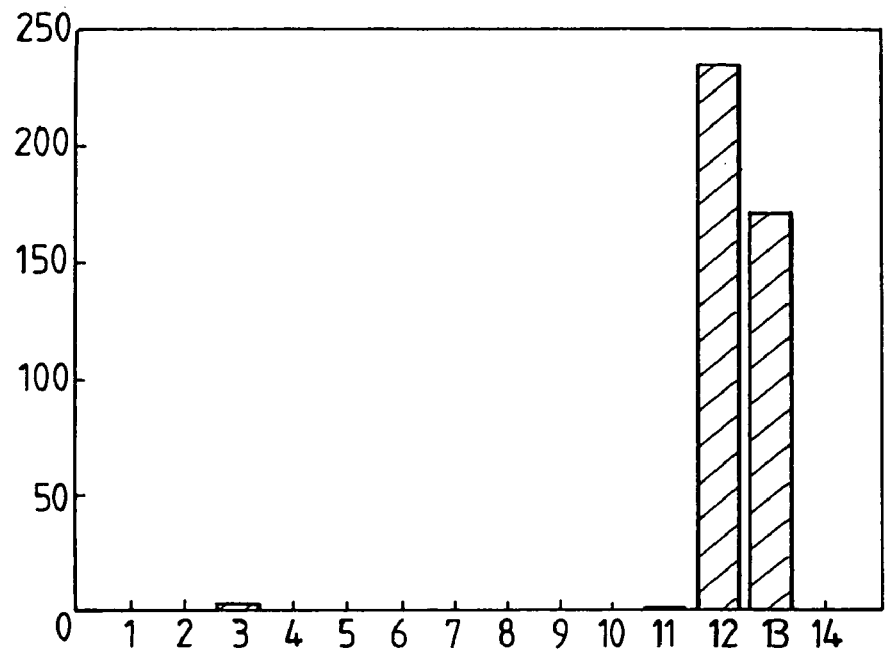
Figure 6:
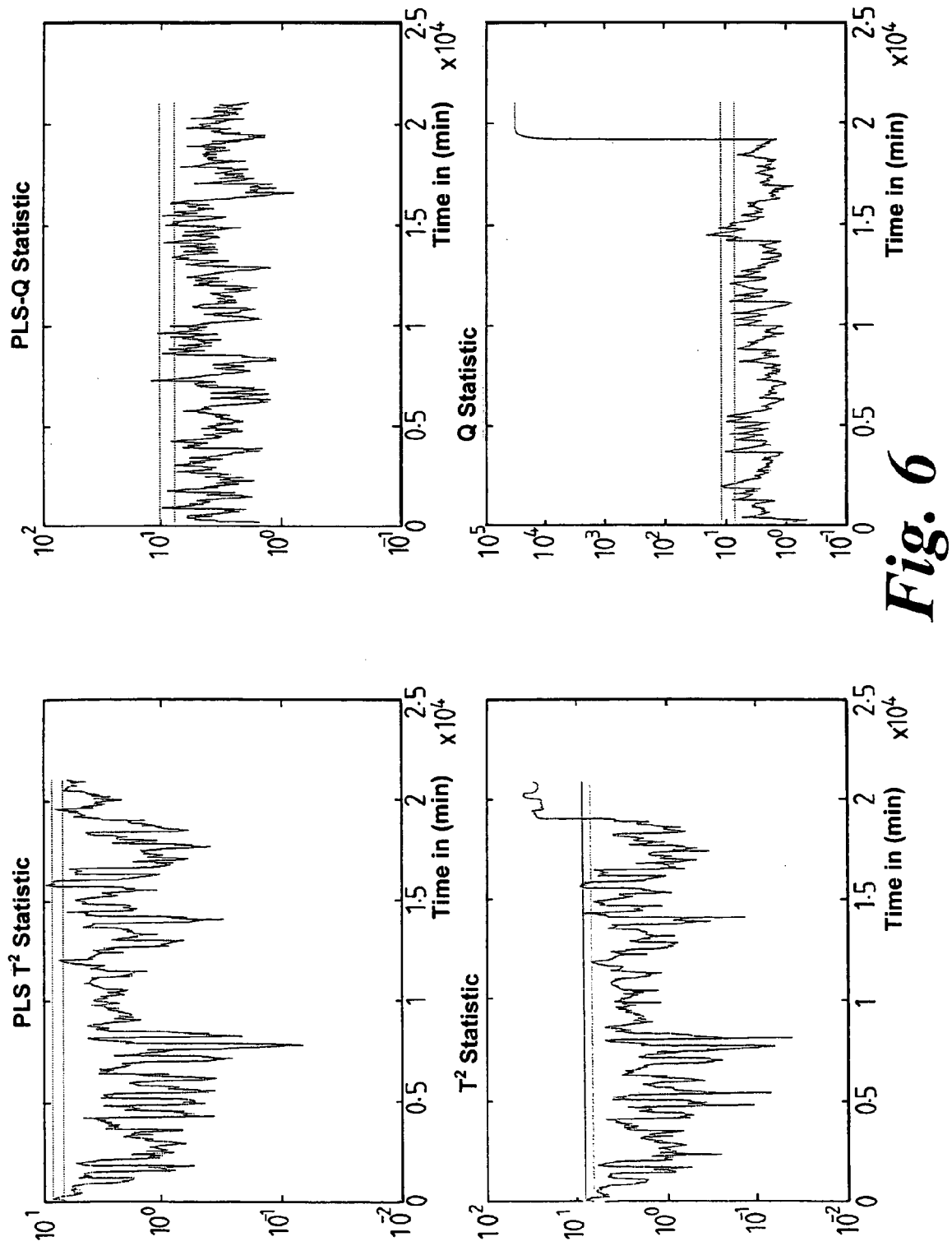

FIG. 5—Error Contribution Chart for Time Instance 11460 min. The $O_2$ and CO Concentration in the Stack Gas Flow have the largest Prediction Error FIG. 6—Statistical Monitoring Charts for the Change in the Regenerated Catalyst Flow into Reactor (Upper Charts represent the PLS Monitoring-Charts -PLS-$T^2$ and -Q statistics- and Lower Charts show the EPLS Monitoring Charts -EPLS-$T^2$ and -Q statistic-)

Figure 7:
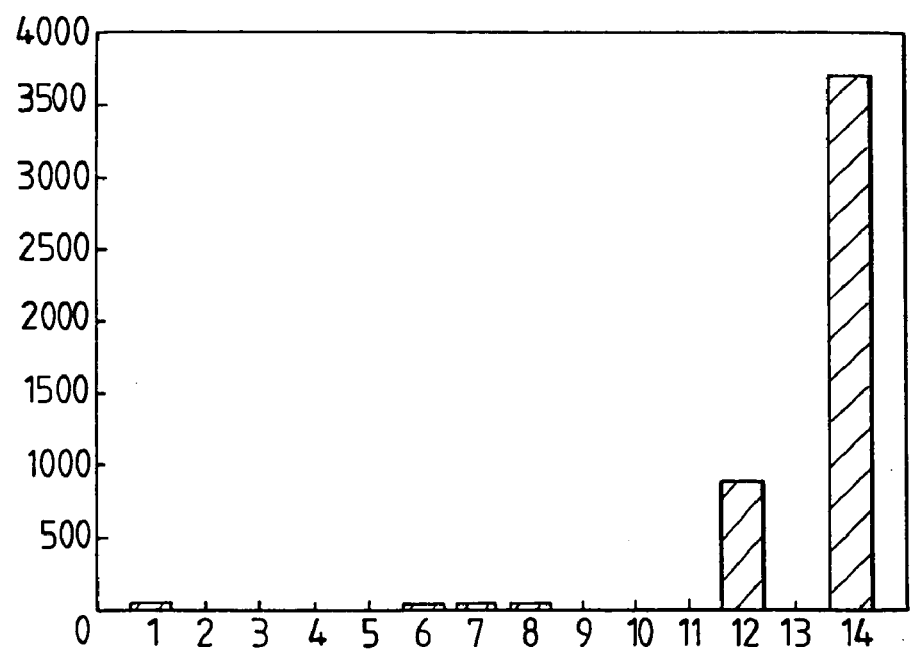
Figure 8:
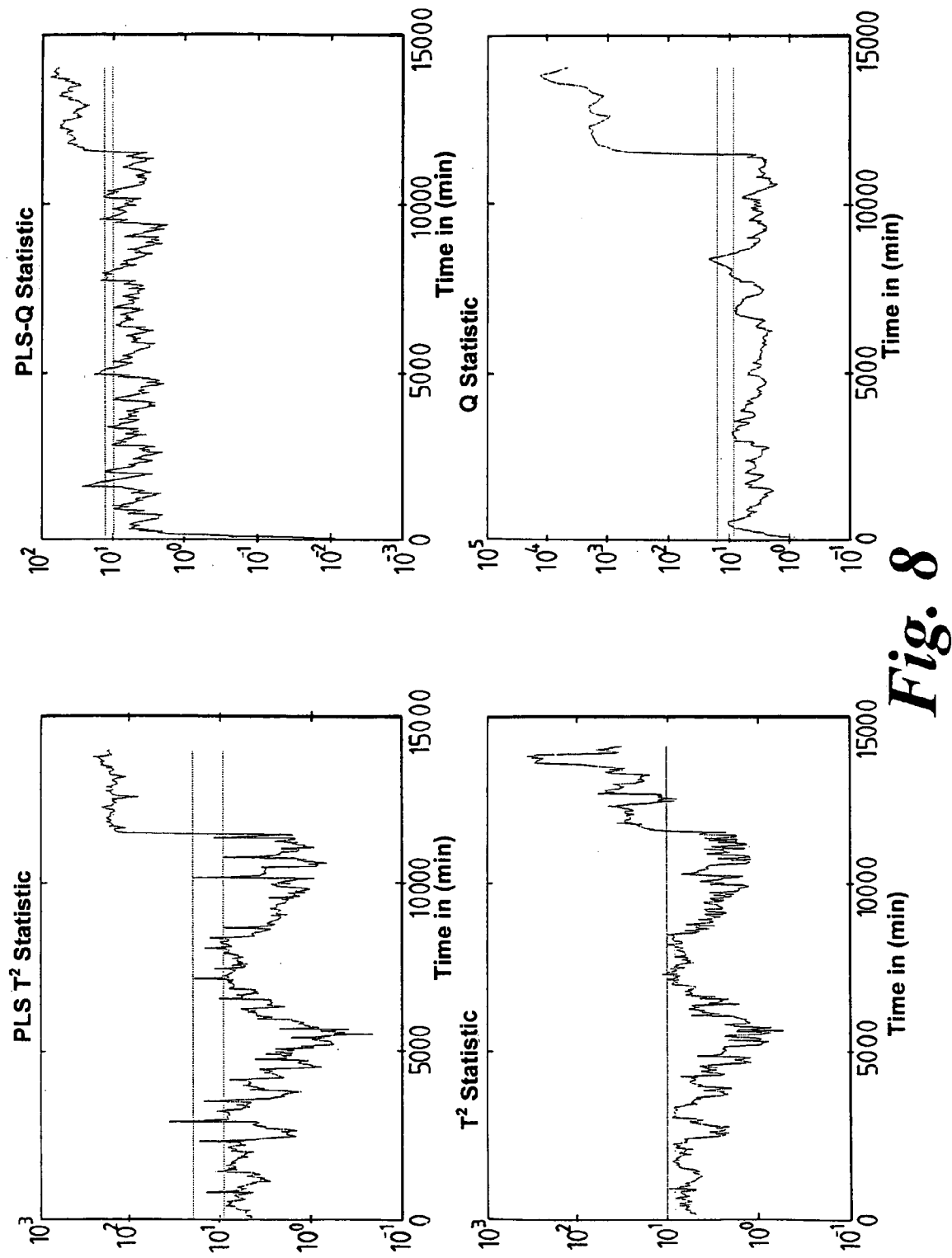

FIG. 7—Error Contribution Chart for the Change of the regenerated Catalyst Flow to Reactor at Time Instance 19357 min. The Standpipe Catalyst Level and $O_2$ Concentration in Stack Gas are mostly affected, Figures for Fluid Catalytic Cracking Unit with Controller Feedback in Predictor Matrix:

FIG. 8—Statistical Monitoring-Charts for Unmeasured Disturbance (Coking Factor); Predictor Variables include the Wet Gas Compressor Suction Valve (Upper Charts represent the PLS Monitoring Charts -PLS-$T^2$ and -Q statistic- and Lower Charts show the EPLS Monitoring Charts -EPLS-$T^2$ and -Q statistic-) at Time Instance 19357 min.

Figure 9:
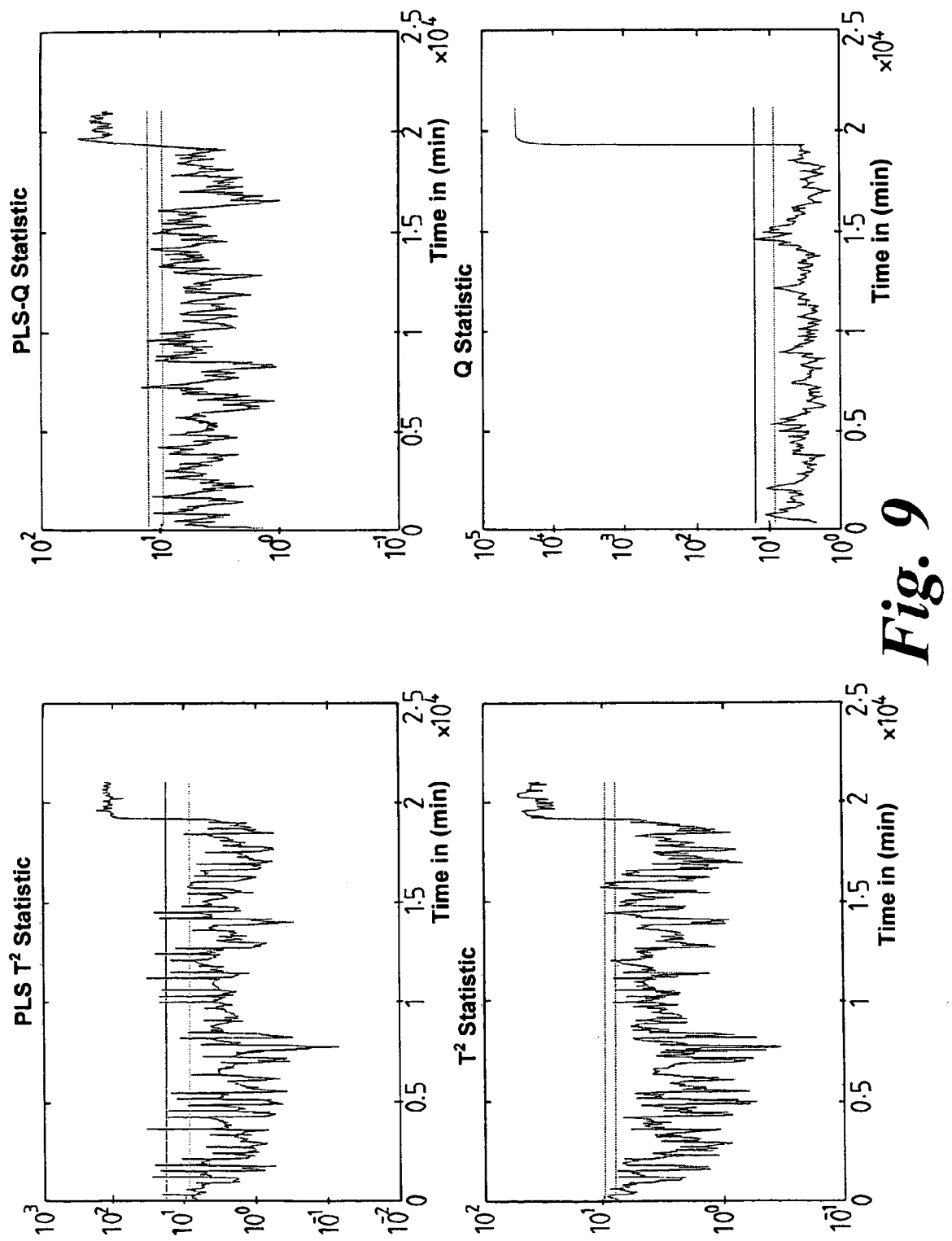

FIG. 9—Statistical Monitoring-Charts for the Change of the regenerated Catalyst Flow to the Reactor; Predictor Variables include the Wet Gas Compressor Suction Valve (Upper Charts represent the PLS Monitoring Charts -PLS-$T^2$ and -Q statistic- and Lower Charts show tge EPLS Monitoring Charts -EPLS-$T^2$ and -Q statistic-)

Figure 10:
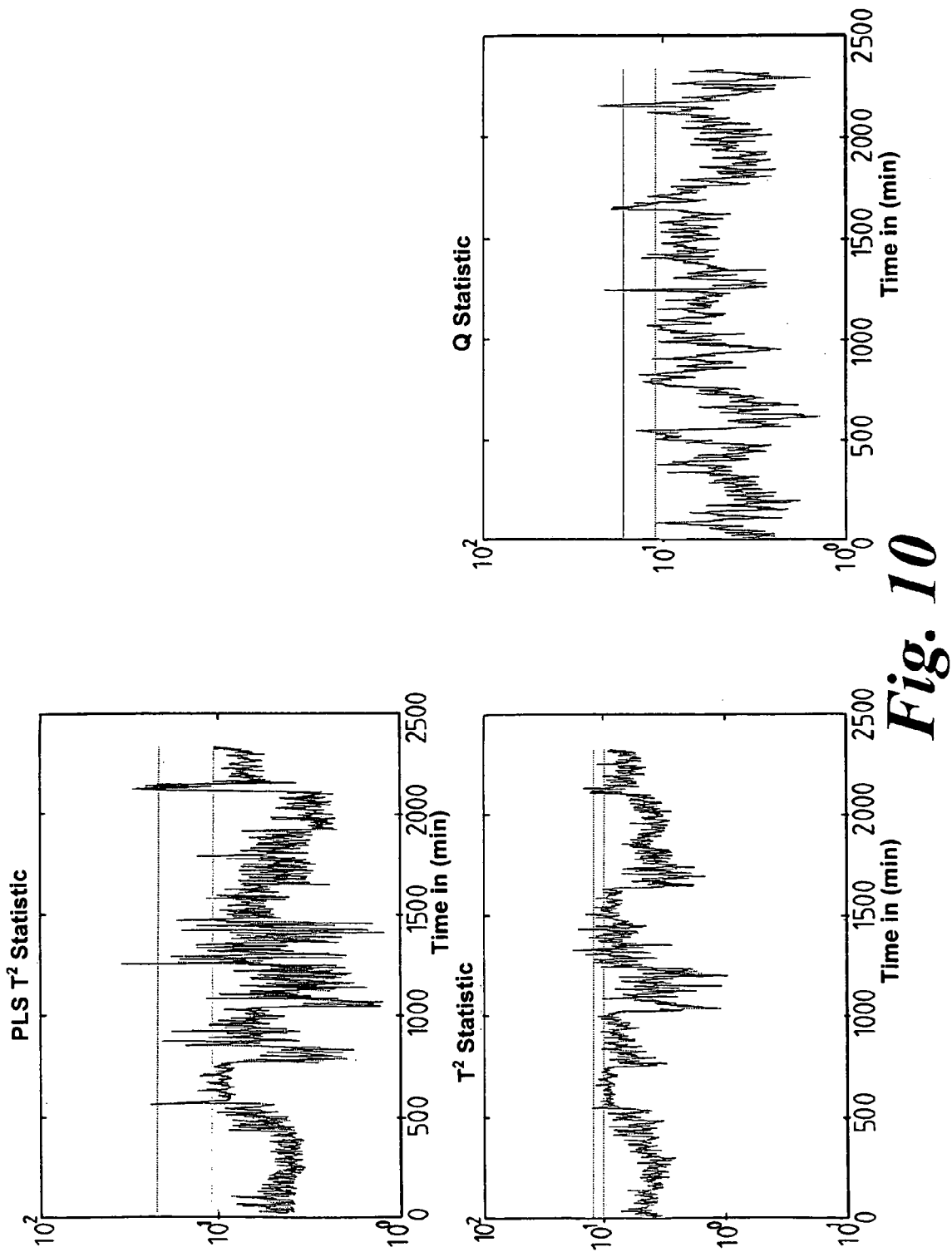

Figures of the Fluidised Bed Reaction Process:

FIG. 10—Statistics Monitoring Charts for Normal Operating Data (Upper Chart represent the PLS Monitoring Chart -PLS-$T^2$ and -Q statistic- and Lower Charts show the EPLS Monitoring Charts -EPLS-$T^2$ and -Q statistic-)

Figure 11:
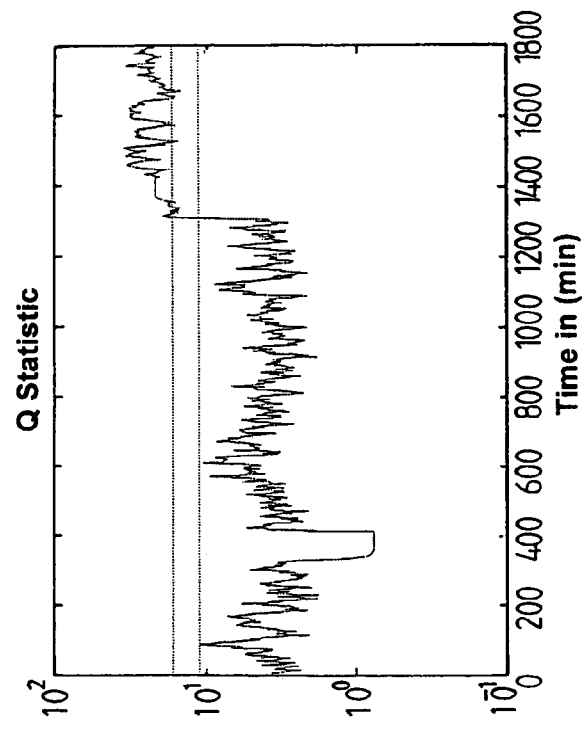
Figure 11:
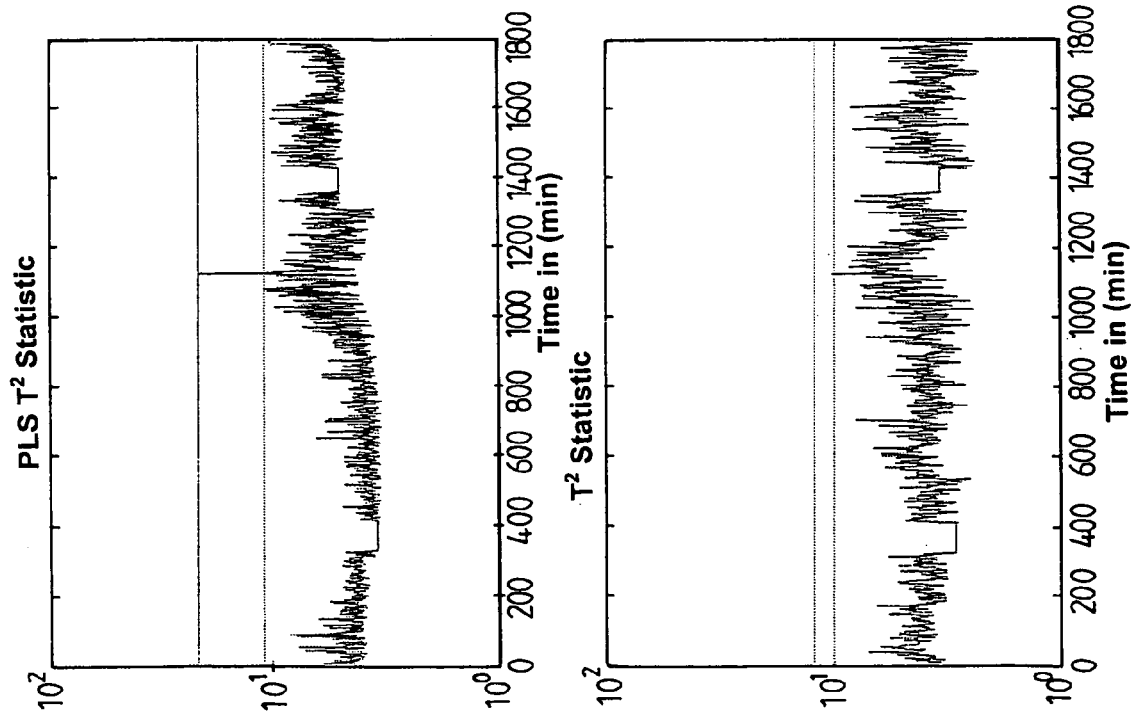

FIG. 11—Statistical Monitoring Charts for the Unmeasured Disturbance; (Upper Chart represent the PLS Monitoring Chart -PLS-$T^2$ and -Q statistic-, Lower Charts show the EPLS Monitoring Charts -EPLS-$T^2$ and -Q statistic-)

Figure 12:
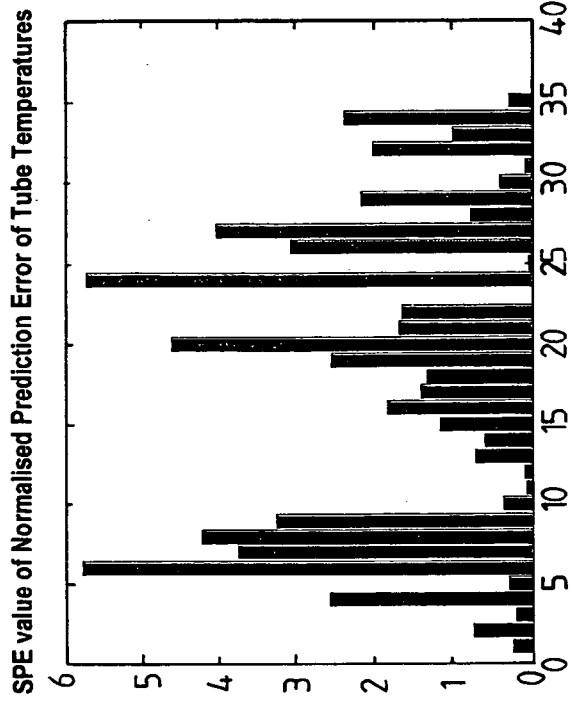
Figure 12:
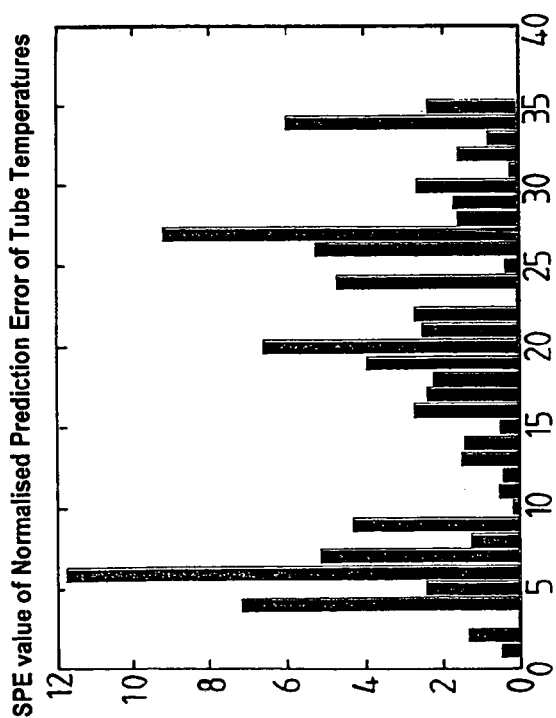
Figure 12:
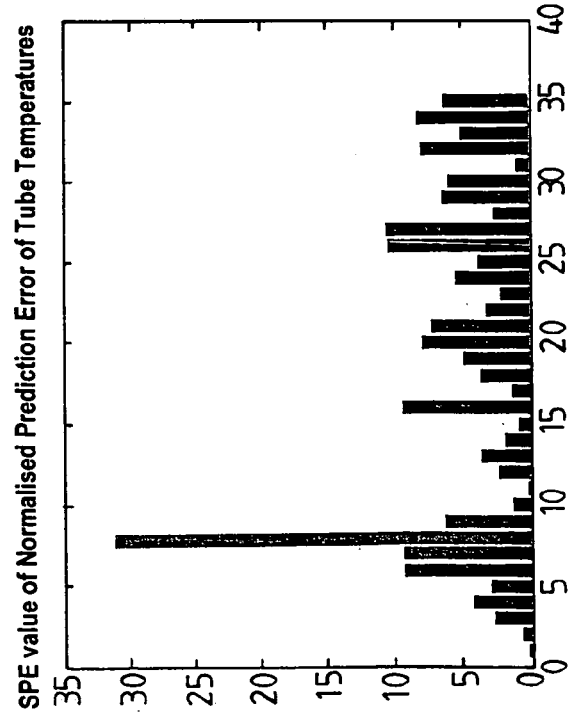

FIG. 12—EC-Charts for Steam Pressure Upset at Time Instances 1500 min (upper Left plot), 1501 min (lower Left plot) and 1502 min (upper right plot)

Figure 13:
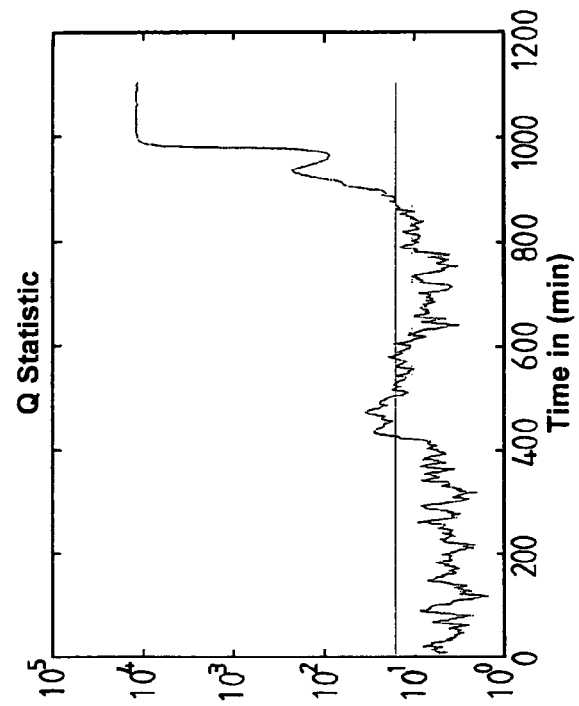
Figure 13:
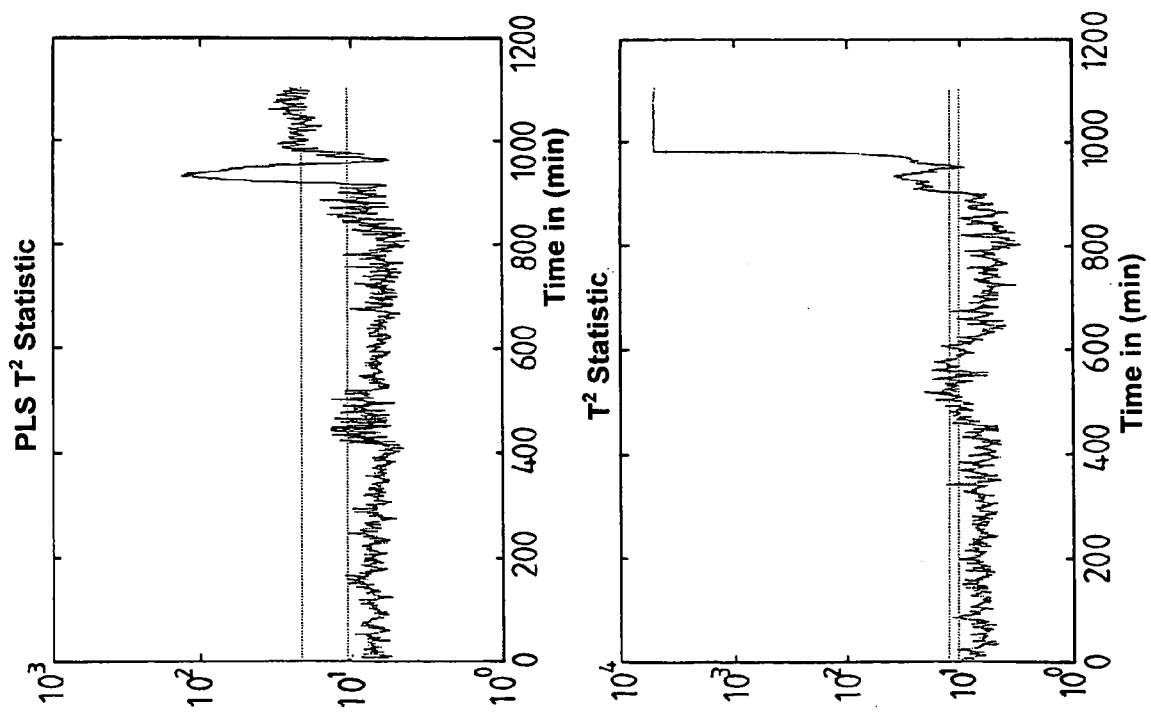

FIG. 13—Statistical Monitoring Charts for an abnormal behaviour of one of the tubes. (Upper Chart represent the PLS Monitoring Chart -PLS-$T^2$ and -Q statistic- Lower Charts show the EPLS Monitoring Charts -EPLS-$T^2$ and -Q statistic-)

Figure 14:
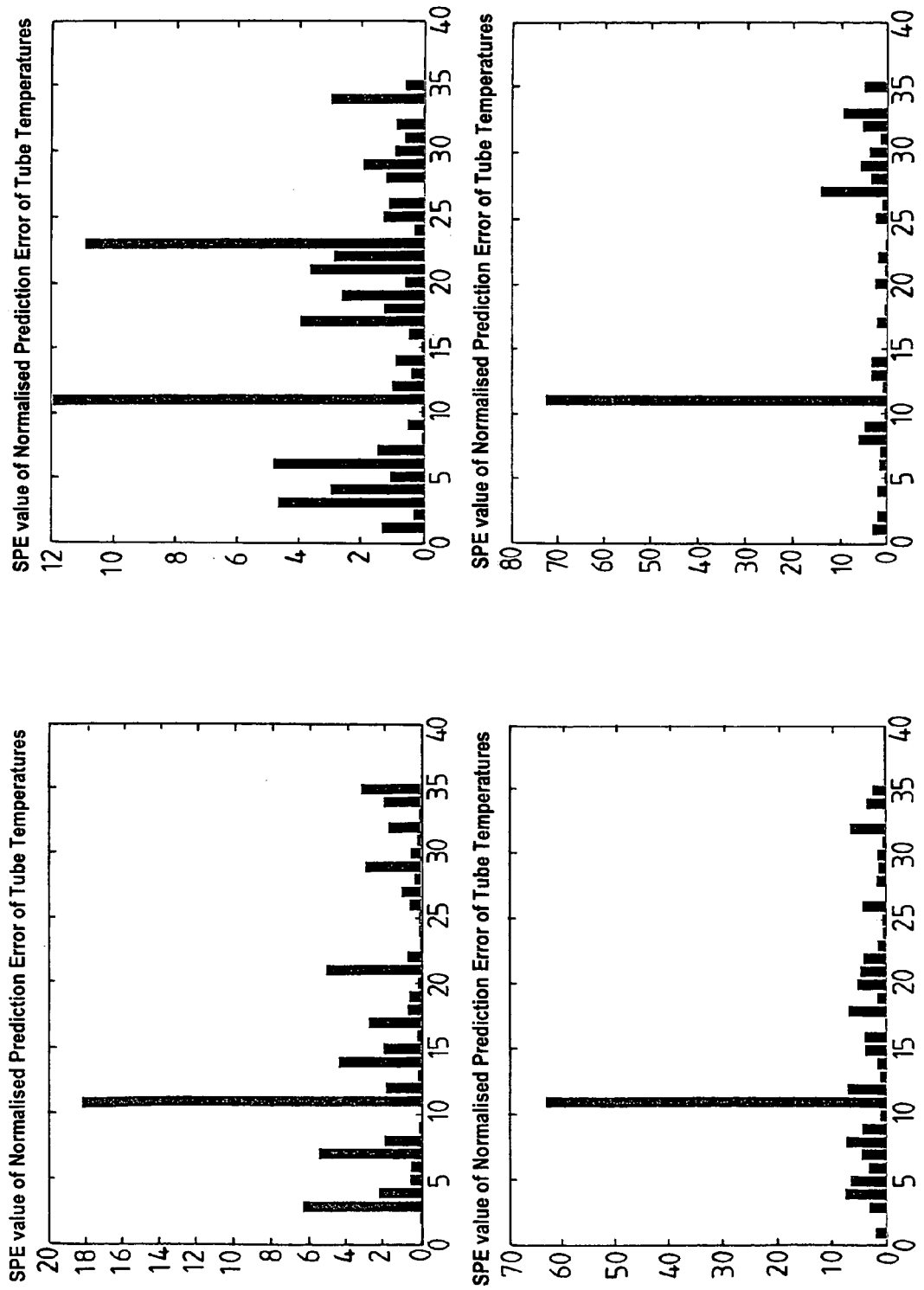

FIG. 14—EC-Charts for Fluidisation Problem in one of the Tubes at Time Instances 436 min (upper left chart), 888 min (upper right chart), 905 min (lower left) and 910 min (lower right chart)

To demonstrate the usefulness of the EPLS monitoring charts, and to make comparison with approach I, two case study examples will now be considered. For each, two typical conditions for abnormal behaviour are generated, which describe the impact of an unmeasured disturbance as well as an "internal" change of the process behaviour. The example processes are the simulation of a fluid catalytic cracking unit (FCCU) introduced by [McFarlane, 1993] and a real industrial process that produces two different solvents as a result of a complex chemical reaction carried out in a fluidised bed reactors.

The organisation of the following description is as follows. In section 2 both the standard PLS algorithm and the new EPLS algorithm are described and compared. Section 3 introduces the condition monitoring statistics associated with these two approaches. Section 4 presents the application case studies to give example of the benefits of EPLS.

2 Partial Least Squares Algorithms 2.1 The Standard PLS Algorithm

The standard PLS identification technique relies on decomposing the predictor matrix, $X_0 \in R^{K \times N}$, and the response matrix, $Y_0 \in R^{K \times N}$ to a sum of rank one component matrices, [Geladi, 1986]. Both matrices contain K data points, the predictor matrix consists of M variables and the response matrix N variables. Both matrices are usually mean centred and appropriately scaled prior to the identification procedure. The decomposition of both matrices is as follows:

$$X_0 = \sum_{i=1}^{M} \tilde{X}_i = \sum_{i=1}^{M} t_i p_i^T = T_M \cdot P_M^T \quad (1)$$

$$Y_0 = \sum_{i=1}^{M} \tilde{Y}_i + E_M = \sum_{i=1}^{M} \hat{u}_i q_i^T + E_M = \hat{U}_M \cdot Q_M^T + E_M,$$

where $\tilde{X}_1$ and $\tilde{Y}_1$ are the component matrices of the predictor and response matrix, respectively. According to equation (1), the rank one matrices can be calculated as a vector product between $t_1$ and $\hat{u}_1$, defined as score vectors or latent variables (LVs), and $p_1$ and $q_1$, defined as loading vectors. M is equal to the number of predictor variables and $E_M$ represents the prediction error of the process model. Note that if all component matrices are included, the predictor matrix is equal to the matrix decompositions. If only n component matrices are included then equation (1) becomes:

$$X_0 = \sum_{i=1}^{n} \tilde{X}_i = \sum_{i=1}^{n} t_i p_i^T = T_n \cdot P_n^T + F_n \quad (2)$$

$$Y_0 = \sum_{i=1}^{n} \tilde{Y}_i + E_n = \sum_{i=1}^{n} \hat{u}_i q_i^T + E_n = \hat{U}_n \cdot Q_n^T + E_n,$$

in which $F_n$ represents the residuals of the predictor matrix. The predicted u-scores, $\hat{u}_1$, can be determined by the following multiplication:

$$\hat{U}_n = [t_1 b_1 \vdots \ldots \vdots t_n b_n] = T_n \text{diag}\{b_n\}, \quad (3)$$

where $\text{diag}\{b_n\}$ is a diagonal matrix containing the regression coefficients, $b_1$, of the score model in successive order. A theoretical analysis of the PLS algorithm can be found in the Appendix 1. Different approaches have been introduced to determine the score and loading vectors, which are the LSQR algorithm [Manne, 1987], the NIPALS algorithm [Geladi, 1986], the SIMPLS algorithm [de Jong, 1993] and others.

Because of the fact that industrial processes often have strongly correlated process variables, only a few LVs may be needed to describe most of the process variation. In contrast, the remaining pairs of LVs basically accommodate noise and insignificant variation in $X_0$ and $Y_0$, [Geladi, 1986], [MacGregor, 1991] and [Wise, 1996]. To determine the number of LVs to be retained, Cross Validation [Wold, 1978] and analysis of variance (ANOVA) [Jackson, 1991] have been discussed.

2.2 Derivation of the EPLS Algorithm and the Generalised Scores

The EPLS algorithm generates scores which represent the variation of the predictor and response variables as well as their residuals and they are referred to as generalised scores. These scores provide the basis for more effective process condition monitoring than the existing approaches, which are mainly based on scores that describe variation in the predictor variables only. The generalised scores are calculated after the weight and loading matrices are determined (see Appendix 1) and rely on augmenting the response matrix to the predictor matrix. The augmented matrix is denoted by Z and is defined as follows:

$$Z = [Y \vdots X], \quad (4)$$

Note that the subscription $_0$ on both matrices is omitted. This is because the derivation of the generalised scores relies on the standard PLS algorithm and the deflation procedure is not required to be carried out again.

From equation (4), subtracting the predicted response matrix, $\hat{Y}_n$, and the reconstructed predictor matrix, $X_n$, with n LVs retained, gives rise to the following expression:

$$[Y \vdots X] - [\hat{Y}_n \vdots X_n] = [E_n \vdots F_n], \quad (5)$$

where $E_n$ is the prediction error of the response matrix and $F_n$ represents the residuals of the predictor matrix. By incorporating equations (2) and (3), equation (5) can be rewritten as:

$$[Y \vdots X] - T_n [\text{diag}\{b_n\} Q_n^T \vdots P_n^1] = [E_n \vdots F_n]. \quad (6)$$

As shown in Appendix 2, the matrix product $P_n^T$ with the PLS regression matrix, $B_{PLS}^{(n)}$, retaining n LVs, is equal to the matrix product of the diagonal matrix $\text{diag}\{b_n\}$ and $Q_n^T$. Integrating this result in equation 6 yields:

$$[Y \vdots X] - T_n P_n^T [B_{PLS}^{(n)} \vdots \Im] = [E_n \vdots F_n], \quad (7)$$

where $\Im$ denotes an M×M identity matrix. Carrying out a post-multiplication of equation (7) by the generalised inverse of $[B_{PLS} \vdots \Im]$ provides:

$$[Y \vdots X][B_{PLS}^{(n)} \vdots \Im]^{\perp} - T_n P_n^T = [E_n \vdots F_n][B_{PLSn} \vdots \Im]^{\perp}, \quad (8)$$

where $^{\perp}$ denotes the generalised inverse. As shown in Appendix 3, the post-multiplication of equation (8) by $R_n$ (see Appendix 1) leads to a formula for calculating the scores of the predictor matrix, $T_n$:

$$T_n = [Y \vdots X][B_{PLS}^{(n)} \vdots \Im]^{\perp} R_n - [E_n \vdots F_n][B_{PLS}^{(n)} \vdots \Im]^{\perp} R_n. \quad (9)$$

In equation (9), the score matrix $T_n$ is equal to the difference of two matrices. The first matrix relates to the predictor and response matrix and the second matrix depends on the prediction error of the response matrix and the residuals of the predictor matrix. The matrix $[E_n \vdots F_n]$ is referred to as the augmented residual matrix to $F_n$. Defining the matrix $[B_{PLS}^{(n)} \vdots \Im]^{\perp} R_n$ as $C_{PLS}^{(n)}$, the resultant matrix $[Y \vdots X] C_{PLS}^{(n)}$ as $T^*_n$ and the matrix product $[E_n \vdots F_n] C_{PLS}^{(n)}$ as $E^*_n$ simplifies equation (9) to:

$$T_n = T^*_n - E^*_n. \quad (10)$$

The columns of the matrix $T^*_n$ are further referred to as the generalised t-scores whilst the columns of the matrix $E^*_n$ are denoted as generalised residual scores. For process condition monitoring, equation (10) provides scores, which describe process variation contained within the absolute values of the predictor and the response matrix, as well as the prediction error matrix, $E_n$, and the residuals of the predictor matrix, $F_n$.

The next section describes the derivation of statistics for $T^*_n$ and $E^*_n$, which can be plotted versus time in univariate monitoring charts.

2.3. Comparison with the Approaches I and II to Process Condition Monitoring As mentioned above, the existing approaches to process condition monitoring are mainly based on the t-scores. [MacGregor, 1995] and [Wise, 1996] outlined that in approach I, the discarded and the retained t-scores form the basis for two monitoring charts which are discussed in the next subsection. Although successful applications of approach I have been discussed, e.g. [Kourti, 1995], [Wise, 1996] and [Morud, 1996], they do not necessarily detect every kind of abnormal process behaviour. This is particularly true if:

1) Abnormal process behaviour affects mainly the response variables that are not under closed-loop control. In this case, the abnormal behaviour does not propagate through to the predictor variables by controller feedback and therefore remains undetected. With EPLS, the variation in the response variables will be apparent.
2) The response variables are highly correlated but the predictor variables are not. In this case, only one statistical chart can be obtained for the standard PLS approach, the T squared chart. With EPLS both charts remain relevant, irrespective of the number of LVs retained.

Approach II relies on scatter-plots and x-y charts of the SPE versus individual t-scores and SPE charts, e.g. [MacGregor, 1991] and [Kresta, 1991]. If the process consists of a large number of highly correlated process variables, e.g. a hundred or more, the number of required scores, however, can be still large for capturing significant process variation. In consequence, with these other approaches, a large number of charts may be required and the situation will be cumbersome to analyse. In contrast EPLS only requires two charts irrespective of the dimension of the problem and the number of LVs selected.

One could also use the SPE chart of response variables in addition to approach I to overcome these above deficiencies. However, this would require at most three monitoring charts and the variation of the response variables is not accumulated in any of these charts. In contrast, the generalised scores only require two monitoring-charts and one of the generalised scores captures the variation of the response variables. It should finally be noted that incorporating the generalised scores for process condition monitoring is similar to the way in which PCA is employed for monitoring industrial processes [Jackson, 1991].

3 Statistics of the PLS and EPLS Approach

3.1 Statistics for PLS

For approach I, two statistical monitoring charts can be obtained based on the decomposition of the predictor matrix. The first monitoring chart is related to the retained t-scores and describes significant contribution for the prediction of response matrix. The second chart is associated with the variation of the predictor matrix that is captured by the discarded t-scores. The discarded t-scores describe insignificant and uncorrelated contribution towards the prediction of the response matrix. However, in the case where all predictor variables contribute significantly towards the variation of the response variables each t-score has to be retained. Hence, there are no t-scores left for computing the second monitoring chart.

The first monitoring chart is based on a statistic, which is denoted as PLS-$T^2$ statistic and the second monitoring chart relates to a statistic, referred to as PLS-Q statistic. Both statistics are defined as follows:

$$_{PLS}T_k^2 = \sum_{i=1}^{n} \left(\frac{t_{ki}}{_T\sigma_i}\right)^2 \quad (11)$$

$$_{PLS}Q_k = \sum_{i=1}^{M} \left(\frac{f_{ki}}{_{\hat{x}}\sigma_i}\right)^2,$$

where $_{PLS}T_k^2$ and $_{PLS}Q_k$ represents the PLS-$T^2$ and -Q statistic. Furthermore, $t_{ki}$ denotes the value of the $i^{th}$ t-score at time instance k and $_T\sigma_i$, the standard deviation of the $i^{th}$ score vector of the predictor variables of the reference data. $f_{ki}$ represents the residuals of the $i^{th}$ predictor variable at time instance k and $_{\hat{x}}\sigma_i$ is the standard deviation of the $i^{th}$ residual variable of the reference data. The notation $T^2$ and Q have been chosen according to Hotelling's $T^2$ and Q statistic used in PCA. Each statistic can be plotted in a monitoring chart versus time. It should be noted that the normalisation of $t_{ki}$ and $f_{ki}$ is essential to provide a sensitive statistic. If this is not done then the t-scores with a large variance, usually the first few, dominate the resultant value of the PLS $T^2$ and the residuals of the predictor variables that have a large variance overshadow residuals with relatively small variance. A fault condition that affects primarily the t-scores or residuals, which have small variations, may remain undetected in this case. Furthermore, in relation to the sum of stochastic variables with zero mean and unit variance (Chi-Squared Distribution), the statistical estimation of thresholds can be used.

If exceptionally large PLS-$T^2$ values occur then the overall process variation is unusually large compared with the reference data of the process. This implies that the general process behaviour has considerably changed or the process has moved to a new operating region. In contrast, unusually large PLS-Q values indicate that the relationships between the predictor variables have changed relative to the relationship prevalent with the reference data.

3.2 Statistics for EPLS

Compared to the standard t-scores, the statistical properties of the generalised scores are summarised below.

1) The generalised t-scores as well as the generalised residual scores are mean centred if the columns in the predictor and the response matrix have been mean centred prior to the PLS identification.
2) The t-scores of the standard PLS algorithm are orthogonal [Hoskuldsson, 1988]. In contrast to the standard t-scores, with EPLS both score types are not orthogonal irrespective of the number of retained LVs. A proof is provided in Appendix 4.

To analyse the generalised scores for process condition monitoring, it is desirable to have statistically independent scores, which requires orthogonality. In order to achieve orthogonal scores, a singular value decomposition (SVD) [Golub, 1996] of the generalised scores can be applied, which results in:

$$T^*_n = V_n^{(T^*)} \Lambda_n^{(T^*)} W_n^{(T^*)1}$$

$$E^*_n = V_n^{(E^*)} \Lambda_n^{(E^*)} W_n^{(E^*)1}, \quad (12)$$

where $V_n^{(T^*)}$, $\Lambda_n^{(T^*)}$, and $W_n^{(T^*)}$ describe the SVD of the generalised t-scores and $V_n^{(E^*)}$, $\Lambda_n^{(E^*)}$, and $W_n^{(E^*)}$ represent the SVD of the generalised residual scores. The dimension of these matrices are as follows, $V_n^{(T^*)}$ and $V_n^{(E^*)}$ are K×n matrices and $\Lambda_n^{(T^*)} \Lambda_n^{(E^*)}$, $W_n^{(T^*)}$ and $W_n^{(E^*)}$ are n×n matrices. The columns of the matrices $V_n^{(T^*)}$, $V_n^{(E^*)}$, $W_n^{(T^*)}$ and $W_n^{(E^*)}$ are orthonormal and $\Lambda_n^{(T^*)} \Lambda_n^{(E^*)}$ are of diagonal type. Based on the SVD of the generalised score matrices of the reference data, the following relationship provides orthogonal scores:

$$\tilde{V}_n^{(T^*)} = T^*_n W_n^{(T^*)} \Lambda_n^{(T^*)-1} \sqrt{K-1}$$

$$\tilde{V}_n^{(E^*)} = E^*_n W_n^{(E^*)} \Lambda_n^{(E^*)-1} \sqrt{K-1}, \qquad (13)$$

in which $\tilde{V}_n^{(T^*)}$ and $\tilde{V}_n^{(E^*)}$ represent orthogonal $T^*_n$ and $E^*_n$ scores with unit variance, respectively. Including equation (13), the orthogonal scores $\tilde{V}_n^{(T^*)}$ and $\tilde{V}_n^{(E^*)}$ can be directly calculated from the augmented data and error matrix, $[Y \vdots X]$ and $[E_n \vdots F_n]$, as:

$$\tilde{V}_n^{(T^*)} = [Y \vdots X] C_{PLS}^{(n)} W_n^{(T^*)} \Lambda_n^{(T^*)-1} \sqrt{K-1} = [Y \vdots X] G_{PLS}^{(n)}$$

$$\tilde{V}_n^{(E^*)} = [E_n \vdots F_n] C_{PLS}^{(n)} W_n^{(E^*)} \Lambda_n^{(E^*)-1} \sqrt{K-1} = [E_n \vdots F_n] H_{PLS}^{(n)} \qquad (14)$$

For the generalised score vectors of the $i^{th}$ data point, ${}_i\tilde{v}_n^{(T^*)}$ and ${}_i\tilde{v}_n^{(E^*)}$, the sum of the squared elements may be used to define a univariate statistic for each vector. These statistics are denoted as ${}_{T^*}T^2$ and ${}_{E^*}T^2$. ${}_{T^*}T^2$ and ${}_{E^*}T^2$ represent the EPLS-$T^2$ and the EPLS-Q statistic and are defined as follows:

$$_{T^*}T_i^2 = \sum_{j=1}^{n} {}_{ij}\tilde{v}_n^{(T^*)2} \qquad (15)$$

$$_{E^*}T_i^2 = \sum_{j=1}^{n} {}_{ij}\tilde{v}_n^{(E^*)2},$$

Under the assumption that ${}_{ij}\tilde{v}^{(T^*)}$ and ${}_{ij}\tilde{v}^{(E^*)}$ are stochastic variables, both statistics have a Chi-Squared distribution with n degrees of freedom, which provides the confidence limits for testing whether the process behaves normally or abnormally. The confidence limits are usually selected to include 95% and 99% of the population (EPLS-$T^2$ or -Q values). If a new EPLS-$T^2$ or Q value is below the limit, the hypothesis that the process behaves normally is accepted, otherwise it is rejected and the accepted hypothesis is that the process is behaving abnormally.

Abnormally large EPLS-$T^2$ and/or -Q values may occur if the relationship between the predictor and response variables, represented by the parametric regression matrix has changed (e.g. time variant process) or the disturbance statistics have changed. Other reasons may be that the process is operating at a different operating point, excessive variation of the process has occurred, which was not present in the reference data, or abnormal process behaviour has occurred. The hypothesis test is therefore a comparison between the current process operation and the process operation captured in the reference data. Note that the reference data describe the process under normal operation and must capture every variation that can occur under normal operation otherwise, the statistical hypothesis test will be too sensitive.

[Wise, 1996] emphasised that the $T^2$ statistics, in particular, may not be normally distributed. [Dunia, 1996] analysed the influence of an Exponential Weighted Moving Average (EWMA) upon the Q statistic incorporating PCA. It was found that the Average Run Length (ARL)—as the average time passed until an abnormal process behaviour is detected—for detecting faulty conditions on sensors could be reduced by invoking the EWMA Q-statistic. In this description, an EWMA approach is applied to the PLS-Q and the EPLS-Q statistic. For these reasons, each confidence limit is empirically determined in this description as suggested by [Box, 1978].

The diagnosis of detected abnormal process behaviour can be carried out by analysing the residuals of the response variables. These residuals can be plotted at each instance in time in a bar chart. A large residual of a particular response variable is considered to be affected by the abnormal process behaviour and vice versa. Furthermore, [Kourti, 1995] outlined that a bar chart can also be produced by the residuals of the predictor variables at each instance in time. If the residual of a specific predictor variable is larger then this variable is considered also to be affected by the abnormal process behaviour. The "largeness" of the residuals of a particular predictor or response variable is relative to the residuals of other predictor and response variables. A comparison of the current residuals has also to be carried out relative to the residuals of the reference data. The bar plots are further referred to as the Error-Contribution Charts (EC-Charts)—one for the response and one for the predictor variables. The bar heights represent thereby the squared residuals of the response variables and the squared residuals of the predictor variables. In order to compare these values with each other statistically, a normalisation has to be carried out. If not, a response variable that cannot be predicted as well as others, for example, will on average cause larger bars relative to the other response variables and vice versa.

4. Case Studies 4.1 Fluid Catalytic Cracking Unit

A fluid catalytic cracking unit or FCCU is an important economic unit in refining operations. It typically receives several different heavy feedstocks from other refinery units and cracks these streams to produce lighter, more valuable components that are eventually blended into gasoline and other products. The particular Model IV unit described by [McFarlane, 1993] is illustrated in FIG. 1. The principal feed to the unit is gas oil, but heavier diesel and wash oil streams also contribute to the total feed stream. Fresh feed is preheated in a heat exchanger and furnace and then passed to the riser, where it is mixed with hot, regenerated catalyst from the regenerator. Slurry from the main fractionator bottoms is also recycled to the riser. The hot catalyst provides the heat necessary for the endothermic cracking reactions. The gaseous cracked products are passed to the main fractionator for separation. Wet gas off the top of the main fractionator is elevated to the pressure of the lights end plant by the wet gas compressor. Further separation of light components occurs in this light ends separation section.

The selected predictor variables for the FCCU case study are given in table 1.

TABLE 1

Selected Predictor Variables for FCCU Case Study

| PREDICTOR VARIABLES | SIGNAL |
|---|---|
| Wash Oil Flowrate | Constantly Zero at all Time |
| Diesel Flowrate | ARMA Sequence |
| Total Fresh Feed | ARIMA Sequence |
| Slurry Flowrate | ARIMA Sequence |
| Preheater Outlet Temperature | ARIMA Sequence |

TABLE 1-continued

Selected Predictor Variables for FCCU Case Study

| PREDICTOR VARIABLES | SIGNAL |
|---|---|
| Reactor Setpoint | Constant |
| Wet-Gas Compressor Suction Valve Position | Depending upon Reactor Pressure |

All of these variables belong to the feed section of the unit. To simulate realistic disturbance conditions, various different Autoregressive Integrated Moving Average (ARIMA) signals were superimposed on these variables, with the exception of Diesel Flowrate, which received only an Autoregressive Moving Average (ARMA) signal as well as the Wash Oil Flowrate and the Reactor Setpoint, which were constant or zero at all time.

The response set included Excess Oxygen in the Flue Gas, Concentration of Carbon Monoxide in the Flue Gas, Riser Temperature, Regenerator Bed Temperature, Regenerator Standpipe Level, as well as nine further measured variables from the system, see [McFarlane, 1993] for a complete list of measured variables for the FCCU system.

To test the PLS and EPLS algorithms, the FCCU simulator was augmented to include several pre-programmed faults that could be applied on command. The first was a step change to the coke formation factor of the feed, which simulated a plug of heavier-than-normal feed entering the unit. The second simulated a disruption in the flow of regenerated catalyst between the regenerator and riser, which is typically caused by partial or complete plugging of steam injectors located in this line.

In the first run, no advanced control system was present, only regulatory controllers for reactor, air compressor flowrates and the reactor pressure. With this controller configuration, no feedback between response and predictor variables was present for runs 1 and 2 because the Wet-Gas Compressor Suction Valve Position was omitted.

FIG. 3 shows the PLS-$T^2$ and -Q monitoring charts as well as the corresponding EPLS charts for a period of approximately 1500 hours of normal operation. In all figures where $T^2$ and Q plots are presented, the upper solid line represents the 99% confidence limit for the particular statistic plotted, while the bottom dotted line represents the 95% confidence limit. Furthermore, the ordinate of each $T^2$ and Q plot is logarithmic to the basis of ten. The sampling period was selected to be 30 min.

In FIG. 4, the responses of the PLS and EPLS $T^2$ and Q statistics are shown for the first fault, injected at approximately 190.5 hours. Since this fault simulates a change in composition of the feed—a plug of heavier feed—, its effect is felt immediately in the riser and subsequently in other parts of the unit that are affected by a change in riser conditions after 191 hours. However, there is no direct mechanistic path back to any part of the feed system, and therefore none of the predictor variables, as defined for runs 1 and 2, are directly effected. Neither are they affected by feedback from the response variables, since no advanced control system is present to provide such feedback. Therefore, the PLS-$T^2$ and -Q charts provide no indication at all that the fault has created an abnormal condition.

In contrast, the EPLS-$T^2$ and -Q statistics plotted in FIG. 4 clearly identify the abnormal condition, at the 99% confidence level. The EC-Chart corresponding to the time at which this event is apparent (after 191 hours) is shown in FIG. 5. Variables 12 and 13, Excess Oxygen in the flue gas and Concentration of Carbon Monoxide in the flue gas, respectively, are clearly contributors to the event. This makes physical sense, since a plug of heavier feed will cause a rapid increase in the amount of coke deposited on the catalyst in the riser and transported to the regenerator, having a direct effect on oxygen consumption and production of carbon monoxide. The contribution chart does not point directly to the potential source of the fault, but does provide an experienced plant operator with information that would assist in narrowing down potential causes. In contrast to the EC-Chart for the response variables, the EC-Chart for the predictor variables does not show large contribution for any variable.

In the second run, the regenerated catalyst fault was applied after 322 hours. Again, since the predictor variables all come from the feed section of the unit, a fault or disturbance occurring in either the reactor or regenerator, or the connecting catalyst lines, will have no mechanistic path back to these variables. In this case, the fault only affects response variables, and conventional PLS-$T^2$ and -Q charts will not detect the event. This is demonstrated in the upper two plots of FIG. 6. However, the EPLS-$T^2$ and -Q charts clearly detect the abnormal condition after 322.5 hours. The corresponding EC-Chart for the response variables. presented in FIG. 7, indicates that Excess Oxygen in the flue gas, and Standpipe Level in the regenerator have significant contributions. This is easily explained since any change in flow of regenerated catalyst will affect the material balance in the standpipe, and hence its level. A change in regenerated catalyst flow will also affect catalyst-to-feed ratio in the riser, resulting in a change in the amount of coke deposited on spent catalyst and subsequently the level of oxygen usage in the regenerator. Note that the EC-Chart for the predictor variables does not show any abnormally large contribution of any variable because of no existing controller feedback.

For runs three and four, the position of the wet gas compressor suction valve was included as a predictor variable. Thus, the effect of any disturbance or fault that affects reactor pressure will be transferred to the predictor variable set through the feedback action of the reactor pressure controller. In this case, both PLS and EPLS would be expected to detect an abnormal condition arising from this type of fault, and this is demonstrated clearly in FIG. 8 for the first fault and FIG. 9 for the second fault.

The application of approach I on the FCCU case study has shown that the PLS monitoring charts can only detect abnormal process behaviour if controller feedback is present in the predictor variables. This implies further that the EC-Charts for the predictor variables do not show any abnormally large contribution to any variable. In contrast, the EPLS charts detected both faults. However, in thepresence of controller feedback, also the PLS charts are sensitive.

4.2 Fluidised Bed Reactor

This industrial process produces two solvent chemicals, denoted as F and G, and consists of several operation units. The core elements of this plant are continuous operating units in which the chemical reaction is carried out. These units are five parallel operating fluidised bed reactors in which each produces F and G by complex exothermic chemical reactions. These reactors are fed with two different streams of five different reactants. FIG. 2 shows one reactor and its adjacent units schematically.

The first stream is comprised of the reactant A and the second stream of the reactants B, C, D and E. A and B are molecules of $X_2$ type, C is an acid, D are molecules that are produced in upstream units and E are plant recycles. D and E are vaporised by an upstream vaporiser before entering the reactor as part of the second stream. Finally, after leaving the reactors, the separation of F and G is achieved by downstream distillation units.

The reactors consist of a large shell and a number of vertically oriented tubes in which the chemical reaction is carried out supported by fluidised catalyst. There is a thermocouple at the bottom of each tube to measure the temperature of the fluidised bed. To remove the heat of the exothermic reaction oil circulates around the tubes. The ratio of F:G is analysed regularly in a lab. Based on this analysis, the F:G ratio is adjusted by the reactor feed-rates. Furthermore, to keep the catalyst fluidised at all times the fluidisation velocity is maintained constant by adjusting reactor pressure relative to the total flow rate.

The chemical reaction is affected by unmeasured disturbances and changes in the fluidisation of the catalyst. The most often observed unmeasured disturbance is caused by pressure upsets of the steam flow required by the vaporiser. Unmeasured disturbances may also by caused by the coolant (oil), provided by a separate unit. Because of the control scheme of the vaporising unit, the pressure upsets of the steam flow result in a larger or smaller flow rate of the second stream entering the reactor. Fluidisation problems appear if the catalyst distribution throughout a tube is considerably greater at the bottom of the tube. This implies that the chemical reaction is reinforced at the bottom of the tube resulting in a significant increase of the tube temperature.

During a period of several weeks, normal operating data as well as data containing process abnormalities were obtained for a particular reactor. The data set for capturing normal process operation (reference data) had to be selected with care. It had to be ensured that the reference data do not capture disturbances as described above or fluidisation problems of one or more tubes. Furthermore, if the size of the reference data were too small then normal variation occurring during the chemical reaction might not be contained in completion. Each data set describe the process in steady state operation. For identifying a steady state PLS model, predictor and response variables had to be chosen. The predictor variables are the flow rate of reactant A, B, D and E, the steam flow to the vaporiser and an additional stream required for reducing the pressure in the vaporiser. As response variables, the temperature of each tube is selected.

A pre-analysis of the data revealed that the tube temperatures are highly correlated. Furthermore, correlation also exists between the predictor variables. However, the determination of the number of LVs to be retained yielded that all six LVs contribute significantly towards to prediction of the response matrix. The selection of how many LVs to retain was carried out applying Leave-One-Out cross-validation. This case is therefore an example of the second drawback that arises when process condition monitoring is carried out by approach I.

Although each score vector of the predictor matrix has to be retained, PLS reduces the number of process variables considerably. After the identification procedure was completed, the six generalised t-scores and the generalised residual scores were computed for the reference data according to equation (9). This was then followed by calculating the corresponding values of the PLS-$T^2$, EPLS-$T^2$ and -Q statistic and the thresholds for the related monitoring charts. Note that the PLS-Q statistic cannot be determined.

FIG. 12 shows the monitoring charts for the PLS and the EPLS approach for the reference data. Note that the values of each statistic are depicted in a logarithmic scale. The graph of the PLS-$T^2$ and EPLS-$T^2$ statistic show natural variation of the process, e.g. due to variations in feed. Furthermore, the graph of the EPLS-$T^2$ statistic shows the impact of common variation (unmeasured disturbances), which the model cannot describe.

The first abnormal process behaviour observed represents a large unmeasured disturbance because of the drop in steam pressure. The resultant monitoring charts are shown in FIG. 13. Although the steam rate remains constant, the enthalpy balance within the vaporiser changes and effects the composition of D and E reactants within the second stream to the reactor. The unmeasured disturbance occurred after about 1300 min into the recorded data set. The EPLS-Q statistic detects this unmeasured disturbance immediately afterwards because the composition of the second stream affects clearly the reaction conditions, which the PLS model cannot describe. The unmeasured disturbance is not picked up by the PLS-$T^2$ and EPLS-$T^2$ statistic because the process variation of this event does not exceed the variation in the reference data. The corresponding EC-charts for 1500, 1501 and 1502 min, see FIG. 14, outlines that for about half of the tubes the temperature cannot be predicted accurately with respect to the reference data. The unmeasured disturbance clearly affects the reaction condition in all of the tubes, which could be confirmed by successively investigating the three EC-Charts. The diagnosis of this abnormal process behaviour is down to an experienced plant operator who could refer the provided information back to the drop of the steam pressure.

The second abnormal process behaviour describes a fluidisation problem in one of the tubes. There are some manipulations that a plant operator can carry out to improve the fluidisation and hence bring the tube temperature back to its normal operating value. However, the first temperature rise passed the plant operator unnoticed. When second temperature rise was detected, an attempt was made to bring the temperature back to its normal operation. FIG. 15 shows the corresponding PLS-$T^2$ and the EPLS monitoring charts. Both EPLS statistics detect in both cases that the tube temperature is abnormally large. In contrast, the PLS $T^2$ statistic only raises alarm at the 99% confidence limit after the second temperature rise. However, also the PLS $T^2$ statistic exceeds at least the 95% confidence limit and indicates therefore abnormal process behaviour. The sensitivity of the PLS-$T^2$ chart is because of the feedback of the control loop for the fluidisation velocity as a consequence of the anomalous tube behaviour. The manipulation of the process operator can be noticed by the sharp kink in each monitoring chart at around 900 min in FIG. 15. After this attempt failed, the plant operator shut the tube eventually down. The monitoring-charts of the EPLS-$T^2$ and -Q statistic correspond to the shut down by shooting off. FIG. 16 shows the EC-charts after 436 min, 888 min, 905 min and 910 min. According to the EC-charts, the plant operator could have started to take action over 450 min earlier to maintain the operation of that tube.

The application of approach I on this industrial example showed that PLS monitoring charts are insensitive (at least in the first example) to detect anomalous behaviour of the process. In the second example, however, PLS could detect the abnormal tube behaviour (at least at the 95% confidence limit). In contrast, the EPLS monitoring charts could clearly detect each process abnormality (at the 99% confidence limit). Furthermore, each LV had to be retained because of its significance for predicting the response variables. Consequently, only one monitoring chart could be obtained for approach I.

The second approach (approach II) would lead to 16 scatter plots and 6 monitoring charts and neither of which describes variation of the response variables. In contrast, EPLS requires two monitoring charts only and the EPLS-$T^2$ statistic does describe variation of the response variables, see equation 9.

5. Conclusions

In this description, the conventional PLS approaches for the condition monitoring of continuous industrial processes, as described in [MacGregor, 1991, 1995], [Kresta, 1991] and [Wise, 1996] are revisited and problem areas are highlighted. This analysis reveals that the conventional PLS monitoring charts may be either insensitive or difficult to analyse in the case where the process behaves abnormally. This description presents an extension to the standard PLS algorithm, referred to as EPLS, which leads to the definition of new PLS scores, denoted as generalised scores. In similar fashion to conventional PLS approaches, statistics can be defined based on the generalised scores of EPLS which can be plotted versus time on monitoring charts. These monitoring charts describe overall variation of the predictor and response variables (EPLS T squared chart) and their residuals (EPLS Q chart).

A theoretical analysis of the monitoring charts derived from the generalised scores of EPLS and conventional PLS approaches reveals that:

1. According to approach I, if abnormal behaviour affects response variables which are not under closed loop control then this situation may remain undetected. With EPLS, the abnormal variation of the response variables will be apparent.
2. In the case where the response variables are highly correlated but the predictor variables are not, approach I only produces one chart, the T squared chart. With EPLS, both charts remain relevant, irrespective of the number of latent variables retained.
3. The second approach (approach II) defines a number of charts dependent upon the number of latent variables retained. In contrast, EPLS only requires two charts irrespective of the number of latent variables selected.
4. Using the squared prediction error chart in conjunction with the two monitoring charts of approach I may overcome the above deficiencies. However, this would lead to at most three monitoring charts and the variation of the response variables is not present in any of these charts. In contrast, EPLS only requires two monitoring charts and the variation of the response variables is not accumulated in the EPLS T squared chart.

This description also presents two application studies to validate the theoretically derived results above. The applications relate to the simulation of a fluid catalytic cracking unit (FCCU) and to a real industrial process. Two anomalous situations are present in both case studies which describe the impact of an unmeasured disturbance and an "internal" change of the process behaviour.

The results of the FCCU case study clearly demonstrate that controller feedback is essential for the approach I to provide a robust and sensitive conditions monitoring tool. If this is not guaranteed then this approach can fail to detect abnormal situations. In contrast, the EPLS approach provides a robust and sensitive monitoring charts irrespective of the presence of controller feedback.

This can also be confirmed by the industrial case study. The first anomalous situation is not detected by the PLS T squared statistic because the upset of the steam pressure does not affect the predictor variables severely enough to be detected. However, the condition of the chemical reaction within the tubes is affected and hence the behaviour of the response variables. The second situation describes an abnormal behaviour of one of the tubes. In this situation, controller feedback affects the predictor variables as a consequence of the anomalous behaviour.

The industrial case study further illustrates that all latent variables contribute significantly to the prediction of the response variables. Thus, only one monitoring chart (the T squared chart) is available for approach I. Furthermore, approach II would lead to the total of 16 scatter plots and 6 monitoring charts. With this number of relevant charts, it is accordingly cumbersome to detect abnormal behaviour as distinct from observing the two EPLS monitoring charts.

Further research on the generalised scores of EPLS focuses on applications incorporating dynamic process models, e.g. as required for model predictive control. It will be investigated whether this dynamic process model also provides the basis for process condition monitoring as distinct from the steady state analysis introduced so far. Additionally, the applicability of the generalised EPLS scores for the monitoring of batch processes will be the subject of future consideration. The PLS approach for monitoring batch processes, discussed in [Nomikos, 1994; and 1995] will thereby provide the basis for the discrimination of a "good" batch from a "bad" batch.

Appendices

A.1 Theoretical Analysis of the PLS Algorithm

The PLS identification algorithm relies on determining each pair of component matrices, $\tilde{X}_k$ and $\tilde{Y}_k$ (see equation 1), by an iterative procedure. After the $k^{th}$ iteration step has been carried out, the calculated component matrices are subtracted from the predictor and the responds matrix, respectively, prior to computing the $(k+1)^{st}$ iteration step. The subtraction of the component matrices is also denoted as deflation procedure and is as follows:

$$X_k = X_{k-1} - \tilde{X}_k = X_{k-1} - t_k p_k^T.$$

$$Y_k = Y_{k-1} - \tilde{Y}_k = Y_{k-1} - \hat{u}_k q_k^T \qquad (A1)$$

The score vectors, $t_k$, $\hat{u}_k$, and loading vectors $p_k$ and $q_k$ are determined to maximise the contribution of each pair of component matrices towards the predictor and response matrices. This is achieved by satisfying the following criteria:

$$t_k = X_{k-1} w_k; \ \|w_k\|_2^2 - 1 = 0$$

$$u_k = Y_{k-1} v_k; \ \|v_k\|_2^2 - 1 = 0,$$

$$J_{wv} = \max\{t_k^T u_k\} = \max\{w_k^T \cdot X_{k-1}^T \cdot Y_{k-1} v_k\} \qquad (A2)$$

$$u_k = b_k t_k + e_k + \hat{u}_k + e_k$$

$$J_e = \min\{e_k^T e_k\} = \min\{u_k^T u_k - 2b_k t_k^T u_k + b_k^2 t_k^T t_k\} \text{ and} \qquad (A3)$$

$$J_p = \min\{\text{trace}\{[X_{k-1} - t_k p_k^T]^T [X_{k-1} - t_k p_k^T]\}\}.$$

$$J_q = \min\{\text{trace}\{[Y_{k-1} - \hat{u}_k q_k^T]^T [Y_{k-1} - \hat{u}_k q_{pk}^T]\}\} \qquad (A4)$$

Solutions to the three cost functions have to be calculated successively. Beginning with equation (A2), $w_k$ and $v_k$ are referred to as the weight vectors of the predictor and response matrix, respectively and $J_{wv}$ represents the value of corresponding cost function. According to [Hoskuldsson, 1988], including the constraints on the length of the weight vectors, equation (A2) can also be rewritten as:

$$X_{k-1}^T Y_{k-1} Y_{k-1}^T X_{k-1} w_k = \lambda_k w_k$$

$$Y_{k-1}^T X_{k-1} X_{k-1}^T Y_{k-1} v_k = \lambda_k v_k \qquad (A5)$$

Equation (A5) outlines that $w_k$ is the eigenvector associated with the largest eigenvalue of the cross covariance matrix $X_{k-1}^T Y_{k-1} Y_{k-1}^T X_{k-1}$ and $v_k$ is the eigenvector corresponding to the largest eigenvalue of the cross covariance matrix $Y_{k-1}^T X_{k-1} X_{k-1}^T Y_{k-1}$. In equation (A3), $b_k$ is the regression coefficient between the $k^{th}$ pair of score vectors, $t_k$ and $u_k$, and $J_e$ is the value of the cost function. The solution to equation (A3) is the ordinary least squares solution for $b_k$. For equation (A4), $J_p$ is the related cost function for determining $p_k$ and $J_q$ for computing $q_k$. The cost functions $J_p$ and $J_q$ are minimised by the following solution [Geladi, 1986]

$$p_k = \frac{X_{k-1}^T t_k}{t_k^T t_k} \qquad (A6)$$

$$q_k = \frac{Y_{k-1}^T \hat{u}_k}{\hat{u}_k^T \hat{u}_k}.$$

Finally, including n latent variables, the matrix of regression coefficients, $B_{PLS}^{(n)}$ between the predictor and response matrix can be calculated as [Lindgren, 1993]:

$$Y_0 = X_0 \cdot B_{PLS}^{(n)} + E_n,$$

$$B_{PLS}^{(n)} = W_n [P_n^T W_n]^{-1} \mathrm{diag}\{b_n\} Q_n^T \qquad (A7)$$

where $W_n$, $P_n$, and $Q_n$ are matrices storing the n weight vectors, $w_k$ and loading vectors, $p_k$ and $q_k$, as columns. According to equation (A2), the weight vector for the predictor matrix, $w_k$, are multiplied with the deflated predictor matrix, $X_{k-1}$ to determine the score vector $t_k$. [Lindgren, 1993], however, outlined that the score vector $t_k$ can also be calculated directly from the original predictor matrix, $X_0$, as follows:

$$t_k = X_0 \cdot r_k; \; r_k = \left[ \prod_{i=1}^{k-1} [\Im - w_i \cdot p_i^T] \right] \cdot w_k \qquad (A8)$$

$$T_n = X_0 [r_1 \ldots r_n] = X_0 R_n; \; R_n = W_n [P_n^T W_n]^{-1}$$

A.2 Proof Required for Equation (7)

The prediction of the response matrix based on n latent variables retained is as follows:

(A9) $\hat{Y}_n = T_n \mathrm{diag}\{b_n\} Q_n^T$.

The t-scores can directly be calculated from the original predictor matrix, see equation A8:

$$T_n = X_n R_n. \qquad (A10)$$

The PLS regression matrix can therefore be determined as:

$$B_{PLS}^{(n)} = R_n \mathrm{diag}\{b_n\} Q_n^T. \qquad (A11)$$

Finally, pre-multiplication with $P_n^T$ provides the required equality (see Appendix 3):

$$P_n^T B_{PLS}^{(n)} = \mathrm{diag}\{b_n\} Q_n^T. \qquad (A12)$$

A.3 Proof Required for Equation (9)

The definition of the matrix $R_n$, see equation A8, can be used to prove that $R_n^T P_n = P_n^T R_n = \Im_{n \times n}$, $\Im_{n \times n}$ denotes an n by n identity matrix. The elements of the matrix product are defined as follows:

$$p_i^T r_j = p_i^T [\Im - w_1 p_1^T] \ldots [\Im - w_{J-1} p_{j-1}^T] w_j; \; 1 \leq i,j \leq n \qquad (A13)$$

If i is larger than j, equation (A13) is equal to zero because scalar products occur between $p_1^T$ and $w_m$, $1 \leq m \leq j$ for which each is equal to zero [Hoskuldsson, 1988] According to equation A.13, if i is smaller than j, the factors of the matrix product can be reduced up to the $i^{th}$ factor, which results in:

$$p_i^T r_i = (p_i^T - p_i^T w_i p_i^T) \ldots [\Im - w_{j-1} p_{j-1}^T] w_i^T; \qquad (A14)$$

$$p_i^T w_i = \frac{t_i^T X_{i-1} w_i}{t_i^T t_i} = 1$$

$$p_i^T r_i = 0$$

Equation (A14) shows that the transposed vector in the right hand term is equal zero and therefore the entire product is equal to zero. Moreover, the fact that $p_1^T w_1 = 1$ also implies that $p_1^T r_1 = 1$. In summary, equations (A13) and (A14) layout that the matrix product $R_n^T P_n$ is equal to an n by n identity matrix.

A.4 Orthogonality of both Generalised Scores

In order to proof that both generalised scores are not orthogonal, the covariance matrices for both scores, including n LVs, are investigated. The covariance matrix of the generalised t-scores is given in equation (A15):

$$S_{T^*T^*}^{(n)} = \frac{1}{K-1} [T_n + E_n^*]^T [T_n + E_n^*] = S_{T^*T}^{(n)} + S_{TF^*}^{(n)} + S_{TF^*}^{(n)T} + S_{F^*F^*}^{(n)} \qquad (A15)$$

$$S_{TE^*}^{(n)} = \frac{1}{K-1} R_n^T X^T [E_n : F_n] C_{PLS}^{(n)} = R_n^T S_{XX}^{(n)} [\Im - R_n P_n^T] \left[ B_{PLS}^{(n)T} B_{PLS}^{(n)} + \Im \right]^{-1} R_n$$

$$S_{E^*E^*}^{(n)} = R_n^T \left[ B_{PLS}^{(n)T} B_{PLS}^{(n)} + \Im \right]^{-1} \left[ B_{PLS}^{(n)T} S_{E_n E_n}^{(n)} B_{PLS}^{(n)} + S_{F_n E_n}^{(n)} B_{PLS}^{(n)} + B_{PLS}^{(n)T} S_{F_n E_n}^{(n)T} + S_{F_n F_n}^{(n)} \right] \left[ B_{PLS}^{(n)T} B_{PLS}^{(n)} + \Im \right]^{-1} R_n^T$$

In equation (A15), $S_{T^*T^*}^{(n)}$, $S_{TT}^{(n)}$, $S_{T^*E^*}^{(n)}$, $S_{XX}^{(n)}$, $S_{F_nE_n}^{(n)}$ and $S_{F_nF_n}^{(n)}$ represent the covariance matrix of the generalised t-scores, the standard t-scores, the generalised residual scores, the predictor variables, the prediction error of the response variables and the residuals of the predictor variables. Furthermore, $S_{TE^*}^{(n)}$ denotes the cross-covariance matrix of the standard t-scores and the generalised residual scores and $S_{1_n1_n}^{(n)}$ is the cross-covariance matrix of the prediction error of the response matrix and the residuals of the predictor matrix. Note that only the covariance matrix $S^{TT(n)}$ is of diagonal type because the standard t-scores are mutually orthogonal [Hoskuldsson, 1988]. According to equation (A15), it can be concluded that the matrices $S_{E^*E^*}^{(n)}$ and $S_{TE^*}^{(n)}$ are not generally of diagonal type, even under the assumption that the columns of the residual matrices, $E_n$ and $F_n$, as well as the predictor matrix X consist of white noise signals. However, in the theoretical case where the number of response variables equals the number of manipulated variables and the process is decoupled, the covariance matrix $S_{E^*E^*}^{(n)}$ and the cross-covariance matrix $S_{TE^*}^{(n)}$ will be of diagonal type. Consequently, the covariance matrix $S_{T^*T^*}^{(n)}$ cannot be of diagonal type if n LVs are retained. If all M (see equation 1) LVs are retained then equation (A15) reduces to:

$$S_{T^*T^*}^{(n)} = S_{TT}^{(n)} + R_M^T[B_{PLS}^{(M)T}B_{PLS}^{(M)} + \Im]^{-1}B_{PLS}^{(M)}$$
$$S_{1_M1_M}^{(n)}B_{PLS}^{(M)}[B_{PLS}^{(M)}B_{PLS}^{(M)} + \Im]^{-1}R_M \quad (A16)$$

Based on the assumption that $E_n$ consists of white noise signals the covariance matrix $S_{E^*E^*}$ is clearly of diagonal type. Because of the pre- and post-multiplication with generally non-diagonal matrices, however, the result is that $S^{E^*E^*(n)}$ and therefore $S_{T^*T^*}^{(n)}$ are solely of symmetric type. The interpretation of the equation (A15) and (A16) has revealed that neither of the covariance matrix $S_{T^*E^*}^{(n)}$ and $S^{T^*T^*(n)}$ is of diagonal type. Hence both generalised score types are generally not orthogonal.

REFERENCES

1. Box G. E. P., Hunter W., Hunter J. S., 1978, Statistics of Experimenters, Wiley, N.Y.
2. Chen Q., Wynne R., Sandoz D. J., 2000, The Application of Principal Component Analysis and Kernel Density Estimation to Enhance Process Monitoring, *Journal of Control Engineering Practise*, to be published in April
3. Dunia R., Qin S. J., Edgar T. F., McAvoy T. J., 1996, Identification of Faulty Sensors Using Principals Component Analysis, *Process Systems Engineering*, Vol. 42, No. 10, pp. 2797–2812
4. McFarlane R. C., Reineman R. C., Bartee J. F., Georgakis C., 1993, Dynamic Simulator for a Model IV Fluid Catalytic Cracking Unit, *Computers in Chemical Engineering*, Vol. 17, No. 3, pp. 275–300
5. Geladi P., 1986, PLS Tutorial, *Analytica Chimica Acta*, Vol. 185: pp. 1–17
6. P. Geladi, 1988, Notes on the History and Nature of Partial Least Squares (PLS) Modelling, *Journal of Chemometrics*, Vol. 2, pp. 231–246
7. Golub G. H., Van Loan C. F., 1996, Matrix Computations, Third Edition, John Hopkins University Press, Baltimore
8. Hoskuldsson A., 1988, PLS Regression Methods, *Journal of Chemometrics*, Vol. 2: 211–228
9. Jackson J. E, 1991, A User's Guide to Principal Components, Wiley, N.Y.
10. De Jong S., 1993, SIMPLS, an Alternative Approach to Partial Least Squares Regression, *Chemometrics and Intelligent Laboratory Systems*, Vol. 18, pp. 251–263
11. Kosanovich K. A., Piovoso M. J., 1991, Process Data Analysis Using Multivariate Statistical Methods, American Control Conference, Boston, Mass.
12. Kourti T, MacGregor J. F., 1995, Process Analysis, Monitoring and Diagnosis, Using Multivariate Projection Methods, *Chemometrics and Intelligent Laboratory Systems*, Vol. 28, pp. 3–21
13. Kresta J. V., MacGregor J. F., Marlin T. E., 1991, Multivariate Statistical Monitoring of Process Operating Performance, *The Canadian Journal of Chemical Engineering*, Vol. 69, pp. 35–47
14. Lindgren F., Geladi P., Wold S., 1993, The Kernel Algorithm for PLS, *Journal of Chemometrics*, Vol. 7, pp. 45–59
15. MacGregor J. F., Marlin T. E., Kresta J., Skagerberg B., 1991, Multivariate Statistical Methods in Process Analysis and Control. AIChE Symposium Proceedings of the Fourth International Conference on Chemical Process Control, AIChE Publ. No. P-67, New York, pp. 79–99
16. MacGregor J. F., Kourti T., 1995, Statistical Process Control of Multivariate Processes, *Control Engineering Practise*, Vol. 3, No. 3, pp. 403–414
17. Morud T. E., 1996, Multivariate Statistical Process Control; Example from the Chemical Process Industry, *Journal of Chemometrics*, Vol. 10, pp. 669–675
18. Nimmo I., 1995, Adequately Address Abnormal Situation Operations, *Chemical Engineering Progress*, Vol. 91, No. 1, pp. 36–45
19. Nomikos P., MacGregor J. F., 1994, Multi-Way Partial Least Squares for Monitoring Batch Processes, First International Chemometrics Internet Conference, September 1994
20. Nomikos, P., MacGregor, J. F., 1995, Multivariate SPC Charts for Monitoring Batch Processes, *Technometrics*, Vol. 37, No. 1, pp. 41–59
21. Manne R., 1987, Analysis of Two Partial-Least Squares Algorithms for Multivariate Calibration, *Chemometrics and Intelligent Laboratory Systems*, Vol. 2, pp. 283–290
22. Piovoso M. J., Kosanovich K. A., 1992, Process Data Chemometrics, *IEEE Transactions on Instrumentation and Measurement*, Vol. 41, No. 2, pp. 262–268
23. Wise B. M., Gallagher N. B., MacGregor J. F., 1996. The Process Chemometrics Approach to Process Monitoring and Fault Detection, *Journal of Process Control*, Vol. 6, No. 6, pp. 329–348
24. H. Wold, 166a, in Research Papers in Statistics, ed. by F. David p. 411, Wiley, N.Y.,
25. H. Wold, 1966b, in Multivariate Analysis, ed. by P. Krishnaiah, p. 391, Academic Press, New York,
26. Wold S., 1978, Cross Validatory Estimation of the Number of Components in Factor and Principal Component Models, *Technometrics*, Vol. 20, No. 4, pp. 397–405

What is claimed is:

1. A computer implemented method of monitoring an industrial process using a partial least squares approach comprising:
   constructing predictor and response matrices from reference data of the process, the predictor matrix being comprised of signals of the manipulated and measured predictor variables of the process, and the response matrix being comprised of the response variables of the process,
   decomposing the predictor and response matrices into rank one component matrices, each of said component matrices being comprised of a vector product in which a score vector describes the variation and a loading vector describes the contribution of the score vector to the predictor or response matrix, decomposition being performed by creating a parametric regression matrix based upon iterations of the decomposition of the predictor and response matrices, characterized by creating generalized t-scores which describe any significant variation of the process including variations of the predictor and response variables, and generalized residual scores which represent the prediction error of the partial least squares model and residuals of the predictor matrix, and plotting the generalized t-scores and the generalized residual scores over time to generate a monitoring chart for visual display, wherein the generalized scores are calculated by constructing an augmented matrix, denoted here by Z and of the form $Z=[Y \vdots X]$, where X is the predictor matrix and Y is the response matrix, and constructing a score matrix $T_n = T^*_n - E^*_n$ in which $T^*_n$ and $E^*_n$ are generally of the form:

$$T^*_n = [Y \vdots X][B_{PLS}^{(n)} \vdots \Im]^1 R_n$$

$$E^*_n = [E_n \vdots F_n][B_{PLS}^{(n)} \vdots \Im]^1 R_n$$

the columns of the matrix $T^*_n$ providing the generalised t-scores and the columns of the matrix $E^*_n$ the generalised residual scores, where $\Im$ denotes an M×M identity matrix, and $B_{PLS}^{(n)}$ is the PLS regression matrix.

2. A computer implemented method of monitoring an industrial process using a partial least squares approach comprising:

constructing predictor and response matrices from reference data of the process, the predictor matrix being comprised of signals of the manipulated and measured predictor variables of the process, and the response matrix being comprised of the response variables of the process, decomposing the predictor and response matrices into rank one component matrices, each of said component matrices being comprised of a vector product in which a score vector describes the variation and a loading vector describes the contribution of the score vector to the predictor or response matrix, decomposition being performed by creating a parametric regression matrix based upon iterations of the decomposition of the predictor and response matrices, characterized by creating a first generalized score vector which describes any significant variation of the process including variations of the predictor and response variables, and a second generalized score vector which represents the prediction error of the partial least squares model and residuals of the predictor matrix, plotting the first generalized score and the second generalized score over time to generate a monitoring chart for visual display, and identifying abnormal process behavior, at least in part, by analyzing the residuals of the response variables.

3. A method of monitoring a process which comprises configuring a multivariate statistical process monitor by the method of claim 1, and identifying abnormal process behavior, at least in part, by analyzing the residuals of the response variables.

4. A method of monitoring a process which comprises configuring a multivariate statistical process monitor by the method of claim 2, and identifying abnormal process behavior, at least in part, by analyzing the residuals of the response variables.

5. A computer implemented method of monitoring an industrial process by a partial least squares model, comprising:

constructing a predictor matrix from reference data of a process being monitored, the predictor matrix comprising signals of predictor variables;

constructing a response matrix from the reference data of the process being monitored, the response matrix comprising signals of response variables; and decomposing the predictor and response matrices into rank one component matrices by creating a parametric regression matrix based upon iterations of a decomposition of the predictor and response matrices, each of the rank one component matrices comprising a vector product in which a score vector describes a variation and a loading vector describes a contribution of the score vector to the predictor matrix or the response matrix, characterized by a first generalized score vector which describes any significant variation of the process including variations of the predictor and response variables, and a second generalized score vector which represents a prediction error of the partial least squares model and residuals of the predictor matrix; and generating statistical monitoring charts representing variation of predictor and response variables together with their residuals, to detect abnormal situations in the continuous multivariable process, wherein the statistical monitoring charts include:

a T-squared monitoring chart representing variation of the predictor and response variables; and a Q monitoring chart representing at least variation of residuals of the response variables.

6. A computer implemented system for monitoring a continuous multivariable industrial process based on a partial least squares model for which more than two latent variables are retained, the system comprising:

a processor configured to plot no more than two statistical monitoring charts representing variation of predictor and response variables together with their residuals, in order to detect abnormal process behavior in the continuous multivariable industrial process, wherein the statistical monitoring charts include:

a T-squared monitoring chart representing variation of the predictor and response variables; and a Q monitoring chart representing at least variation of residuals of the response variables; and wherein the statistical monitoring charts are used to detect the abnormal process behavior in the continuous multivariable industrial process by analyzing a variation in the residuals of the response variables.

7. The system of claim 6, wherein the statistical monitoring charts have a time base.

8. The system of claim 6, wherein the response variables are not under closed-loop control with the predictor variables.

9. The system of claim 6, wherein the multivariate statistical process monitoring system is operable to detect abnormal process behavior that affects mainly the response variables that are not under closed-loop control.

10. The system of claim 6, wherein a first one of two statistical monitoring charts is based on a first generalized score vector which describes any significant variation of the process including variations of predictor and response variables, and a second statistical monitoring chart is based on a second generalized score vector which represents a prediction error of the partial least squares model and residuals of a predictor matrix.

11. A computer implemented industrial process monitor comprising a multivariate statistical model of the process, the model having been configured by a partial least squares approach, wherein predictor and response matrices are constructed from reference data of the process, the predictor matrix being comprised of signals of the manipulated and measured predictor variables of the process, and the response matrix being comprised of the response variables of the process, the model configured to decompose the predictor and response matrices into rank one component matrices, each of said component matrices being comprised of a vector product in which a score vector describes the variation and a loading vector describes the contribution of the score vector to the predictor or response matrix, decomposition being performed by the creation of a parametric regression matrix based upon iterations of the decomposition of the predictor and response matrices, the model further configured by the creation of a first generalized score vector which describes any significant variation of the process including variations of the predictor and response variables, and a second generalized score vector which represents the prediction error of the partial least squares model and residuals of the predictor matrix, and the model configured to plot the first generalized score and the second generalized score over time to generate a monitoring chart for visual display, wherein the industrial process monitor is arranged to identify abnormal process behavior, at least in part, by analyzing the residuals of the response variables.

12. A computer implemented industrial process monitor comprising a multivariate statistical model of the process, the model having been configured by a partial least squares approach, wherein predictor and response matrices are constructed from reference data of the process, the predictor matrix being comprised of signals of the manipulated and measured predictor variables of the process, and the response matrix being comprised of the response variables of the process, the model configured to decompose the predictor and response matrices into rank one component matrices, each of said component matrices being comprised of a vector product in which a score vector describes the variation and a loading vector describes the contribution of the score vector to the predictor or response matrix, decomposition being performed by the creation of a parametric regression matrix based upon iterations of the decomposition of the predictor and response matrices, the model further configured by the creation of generalized t-scores which describe any significant variation of the process including variations of the predictor and response variables, and generalized residual scores which represent the prediction error of the partial least squares model and residuals of the predictor matrix, and the model configured to plot the generalized t-scores and the generalized residual scores over time to generate a monitoring chart for visual display, wherein the generalized scores are calculated by constructing an augmented matrix, denoted here by Z and of the form $Z=[Y \vdots X]$, where X is the predictor matrix and Y is the response matrix, and constructing a score matrix $T_n = T^*_n - E^*_n$ in which $T^*_n$ and $E^*_n$ are generally of the form:

$$T^*_n = [Y \vdots X][B_{PLS}^{(n)} \vdots \Im]^1 R_n$$

$$E^*_n = [E_n \vdots F_n][B_{PLS}^{(n)} \vdots \Im]^1 R_n$$

the columns of the matrix $T^*_n$ providing the generalised t-scores and the columns of the matrix $E^*_n$ the generalised residual scores, where $\Im$ denotes an M×M identity matrix, and $B_{PLS}^{(n)}$ is the PLS regression matrix.

13. An industrial process monitor as claimed in claim 12, which is arranged to identify abnormal process behavior, at least in part, by analyzing the residuals of the response variables.

* * * * *